United States Patent [19]

Wijmans

[11] Patent Number: 5,089,033
[45] Date of Patent: Feb. 18, 1992

[54] PROCESS FOR REMOVING CONDENSABLE COMPONENTS FROM GAS STREAMS

[75] Inventor: Johannes G. Wijmans, Menlo Park, Calif.

[73] Assignee: Membrane Technology & Research, Inc., Menlo Park, Calif.

[21] Appl. No.: 649,305

[22] Filed: Jan. 30, 1991

Related U.S. Application Data

[63] Continuation of Ser. No. 432,592, Nov. 2, 1989, abandoned.

[51] Int. Cl.[5] ............... B01D 53/22; B01D 71/24
[52] U.S. Cl. ............................... 55/16; 55/23; 55/68; 55/73
[58] Field of Search ............ 55/16, 23, 68, 73, 158; 62/18

[56] References Cited

U.S. PATENT DOCUMENTS

| | | | |
|---|---|---|---|
| 3,250,080 | 5/1966 | Garwin | 55/16 X |
| 3,324,626 | 6/1967 | Dresser et al. | 55/23 X |
| 4,119,417 | 10/1978 | Heki et al. | 55/16 X |
| 4,243,701 | 1/1981 | Riley et al. | 55/158 X |
| 4,264,338 | 4/1981 | Null | 55/16 |
| 4,435,191 | 3/1984 | Graham | 55/16 |
| 4,444,571 | 4/1984 | Matson | 55/16 |
| 4,529,411 | 7/1985 | Goddin, Jr. et al. | 55/16 |
| 4,553,983 | 11/1985 | Baker | 55/16 |
| 4,602,477 | 7/1986 | Lucadamo | 55/158 X |
| 4,639,257 | 1/1987 | Duckett et al. | 55/16 |
| 4,654,063 | 3/1987 | Auvil et al. | 55/158 X |
| 4,675,030 | 6/1987 | Czarnecki et al. | 55/158 X |
| 4,717,407 | 1/1988 | Choe et al. | 55/158 X |
| 4,758,250 | 7/1988 | Laciak et al. | 55/158 X |
| 4,817,392 | 4/1989 | Agrawal et al. | 62/18 |

FOREIGN PATENT DOCUMENTS

| | | |
|---|---|---|
| 0100923 | 2/1984 | European Pat. Off. ............ 55/16 |
| 0186843 | 7/1986 | European Pat. Off. ............ 55/16 |
| 0329962 | 8/1989 | European Pat. Off. . |
| 63-175602 | 7/1988 | Japan ............................... 55/16 |

OTHER PUBLICATIONS

S. S. Kremen, "Technology & Engineering of ROGA Spiral-Wound Reverse Osmosis Membrane Modules", 1977, pp. 371–385, In Reverse Osmosis & Synthetic Membranes, National Research Council Canada.

Y. Shindo et al., "Calculation Methods for Multicomponent Gas Separation", 1985, pp. 445–459, Sep. Sci. & Tech., 20, (5&6), Marcel Dekker, Inc.

R. D. Behling, "Separation of Hydrocarbon Vapors from Air", 1988, 6th Annual Membrane Technology Planning Conference Proceed, BCC Communications, 3/89.

*Primary Examiner*—Robert Spitzer
*Attorney, Agent, or Firm*—J. Farrant

[57] ABSTRACT

A process for treating a gas stream to remove or recover a condensable component. The process involves a condensation step and a membrane concentration step. The condensation step may be followed by the membrane step, or vice versa. The process can be designed to yield only two product streams: one, the condensed liquid, ready for use, reuse or discard, and two, a residue gas stream, which in most cases will be clean enough for direct discharge or reuse. This result is achieved by recycling other streams within the process. Recovery of 90% or more of the condensable component can be achieved. The process offers substantially energy savings compared with condensation alone.

45 Claims, 15 Drawing Sheets

PROCESS FOR REMOVING CONDENSABLE COMPONENTS FROM GAS STREAMS

This is a continuation of application Ser. No. 432,592, filed Nov. 2, 1989, now abandoned.

BACKGROUND OF THE INVENTION

Gas streams containing condensable components, such as sulfur dioxide or various organic vapors, arise from numerous industrial and commercial processes. Venting such gases to the atmosphere wastes resources and causes pollution problems. Industries throughout the world are, therefore, under increasing pressure to clean up waste gas emissions. A widely used treatment method is condensation. The idea is to cool and/or compress the gas beyond the dewpoint of the condensable constituent. A portion of the condensable component will then condense out and can be drawn off in liquid form for reuse or disposal. The degree of removal that can be achieved in this way will depend on the initial concentration, the boiling point of the condensable, and the operating conditions of the process. Problems encountered in such processes are 1) low concentration of the condensable component in the stream, and/or low boiling point, so that the dew point is difficult to reach, and 2) need for regular defrosting. Compressing the gas stream above about 10-15 atmospheres requires large energy consumption and costs increase rapidly in proportion to compressor capacity. If the gas has to be cooled below 0° C., then ice formation in the condenser from water vapor entrained in the feed vapor may occur. Even if the gas stream is pre-dried, taking it down to cryogenic temperatures will again be a costly, energy intensive procedure. These practical matters tend to limit the extent of condensable removal that can be attained. Even under favorable operating conditions, 20% or more of the condensable component may be left in the non-condensed bleed gas from the condenser.

Cryogenic condensation and compression/condensation units have been in widespread use for many years. Condensation is a valuable method of waste treatment and pollution control. Nevertheless there remains a longstanding need to improve condensation technology. Recent evidence concerning the adverse environmental effects of halogenated hydrocarbons and chlorofluorocarbons (CFCs) has dramatically intensified that need.

SUMMARY OF THE INVENTION

The invention is a combination, or "hybrid", process that can reduce the concentration of a condensable component in a gas stream to 5% or less of its original value, and, because of the inherent complementary features of the two processes, can do this in a highly efficient, economic manner.

The process involves two main steps, a condensation step and a membrane concentration step. The condensation step may be followed by the membrane step, or vice versa. Streams containing low concentrations of the condensable component will typically benefit from membrane concentration followed by condensation. Streams close to saturation with the condensable component are preferably treated by condensation followed by membrane concentration. If desired, the hybrid process can be designed to yield only two product streams: one, the condensed liquid, ready for use, reuse or discard, and two, a gas stream containing only 5% or less of the original condensable content, which in most cases will be clean enough for direct discharge or reuse. This result is achieved by recycling other streams within the process. If the membrane concentration step is performed after the condensation step, then the permeate stream from the membrane step can be returned and fed back into the condensation process. If the condensation step is performed after the membrane concentration step, then the non-condensed gases can be returned to the feed of the membrane concentration step. Thus, no secondary wastes or pollution problems are created by the process.

Both condensation and membrane separation may be used alone for treating gases containing condensable components. Table 1 summarizes the representative features of the individual processes. As can be seen, each process has its strengths and weaknesses. In particular, the operating costs of a condensation process are strongly dependent on the boiling point of the condensable material. Compounds with relatively high boiling points, for example room temperature or above, can be handled much more efficiently than those with lower boiling points, particularly those with boiling points below 0° C. Condensation becomes increasingly expensive with decreasing feed concentration. At high feed concentrations, condensation is cheaper than membrane separation. In contrast, membrane separation process costs are independent of feed concentration, and membranes are known that exhibit useful selectivities in separating volatile, low-boiling organics and other compounds from air, for example. Condensation is frequently performed by first compressing the gas stream to be treated to an elevated pressure, such as 2-15 atmospheres. Consequently, the non-condensed fraction of gas leaving the condenser is often at high pressure. This high pressure can be used to provide the driving force for membrane permeation. The membrane separation step can then be carried out without the need for any additional energy use whatsoever. A process that combines the two individual treatment methods can utilize the advantages of each one to create an optimized process that achieves better results, at higher efficiency, than could be gotten from either method alone.

TABLE 1

Comparative Features of Condensation and Membrane Separation

| Feature | Condensation | Membrane Separation |
| --- | --- | --- |
| Effect of feedstream solvent concentration on cost per scfm treated | decreases with increasing concentration | independent of concentration |
| Typical feedstream concentrations used | 20-100% saturated | 0.1-20% |
| Size and mobility | large, immobile | compact, mobile |
| Ease of operation | simple | simple |
| Typical solvent removals | 75-95% | 80-95% |
| Is solvent recovery possible? | yes | yes |

TABLE 1-continued

Comparative Features of Condensation and Membrane Separation

| Feature | Condensation | Membrane Separation |
|---|---|---|
| Are secondary waste streams created? | no | no |
| Versatility | works with almost all condensables with boiling point above room temperature | works with almost all volatile materials |
| Capital cost ($/scfm treated) | — | $400–1,000/scfm |
| Operating cost ($/1000 scfm treated) | $0.2–3.0 decreases with increasing feed concentration and is a strong function of boiling point | $0.5–1.0 |

The advantages of the combination process include:
1. Versatility. The process can be designed to handle very dilute or very concentrated streams efficiently.
2. Economy. The combination process can be designed to offer energy and cost savings compared with other treatment methods.
3. High degree of removal. The combination process can improve five-fold or more on the degree of removal of condensable components achievable with condensation alone.
4. No secondary streams. The process can be designed to generate only two product streams, a condensed liquid stream and a gas stream sufficiently free of condensable compounds for discharge or reuse.
5. Condensable recovery. The process enables the condensable component to be recovered in a form suitable for reuse. Both individual processes also offer this capability.
6. Use at source. The process can be designed to operate without the need for prior pooling, dilution or concentration of the waste stream.

The gas stream to be treated by the process of the invention may be an effluent stream that would otherwise be discharged into the atmosphere untreated, or would be subject to some other treatment method or methods. Alternatively it may be an internal process stream from which it is desirable, for example, to recover an organic solvent for reuse. The process could be carried out by fitting a membrane unit to existing condensation units, or by installing a new combined condensation/membrane unit. Adding membrane units, either in front of, or behind, existing condensation units, is a relatively simple engineering task. The capital cost of the membrane equipment could be recovered within months in the most favorable applications.

The process of the invention involves running a feed gas stream containing a condensable component through two treatment steps, a condensation step and a membrane separation step.

THE MEMBRANE SEPARATION STEP

The membrane separation step involves running the gas stream containing a condensable component across a membrane that is selectively permeable to that component. The condensable component is therefore concentrated in the stream permeating the membrane; the residue, non-permeating, stream is correspondingly depleted in condensable content. The driving force for permeation across the membrane is the pressure difference between the feed and permeate sides, which can be generated in a variety of ways. The membrane separation process produces a permeate stream enriched in the condensable component compared with the feed and a residue stream depleted in the condensable component.

The membrane separation process may be configured in many possible ways, and may include a single membrane stage or an array of two or more units in series or cascade arrangements. Eighty to 90% or above removal of the condensable content of the feed to the membrane system can typically be achieved with an appropriately designed membrane separation process, leaving a residue stream containing only traces of the condensable material. The permeate stream is typically concentrated 5- to 100-fold compared with the feedstream.

The membrane used in the membrane separation step will typically be selectively permeable to the condensable component of the feedstream, so that the permeate stream from the membrane is enriched many-fold in the condensable component. However, it is also possible to operate the membrane step using membranes that are selectively permeable to other components of the gas stream. In this case the non-permeating, or residue, stream is enriched in the condensable component.

THE CONDENSATION STEP

The condensation step may be performed by simply chilling the gas stream down to a temperature at which a substantial fraction of the condensable content of the stream will condense. Simple chilling may be efficient in situations where the boiling point of the condensable material is relatively high.

Compressing the gas raises the dewpoint temperature, so a combination of compression and chilling will normally be the most efficient way to carry out the condensation step. Typically, then, the condensation step will involve running the gas stream through a compressor, then chilling it to a temperature below the dewpoint temperature at that pressure. Eighty percent or above removal of the condensable content can typically be achieved by the condensation system.

It is an object of the invention to provide a treatment process for handling gas steams containing a condensable component.

It is an object of the invention to provide a treatment process for handling gas streams containing a condensable component so that a high percentage of the condensable component can be recovered.

It is an object of the invention to provide an economically attractive treatment process for handling gas streams containing a condensable component.

It is an object of the invention to reduce gas emissions to the atmosphere.

It is an object of the invention to reduce emissions of organic vapors to the atmosphere.

It is an object of the invention to improve the performance of condensation units for removing condensable components from gas streams.

It is an object of the invention to allow condensation units to be operated at higher temperatures and lower pressures than previously.

Other objects and advantages of the invention will be apparent from the description of the invention to those of ordinary skill in the art.

Although the process has principally been described in terms of a waste reduction or treatment technology, it should be clear that the process is equally applicable to the separation of condensable materials from any gas stream. The stream to be treated will most likely be air, but could be any gas or mixture of gases.

It is to be understood that the above summary and the following detailed description are intended to explain and illustrate the invention without restricting its scope.

DETAILED DESCRIPTION OF THE INVENTION

Figure 1:
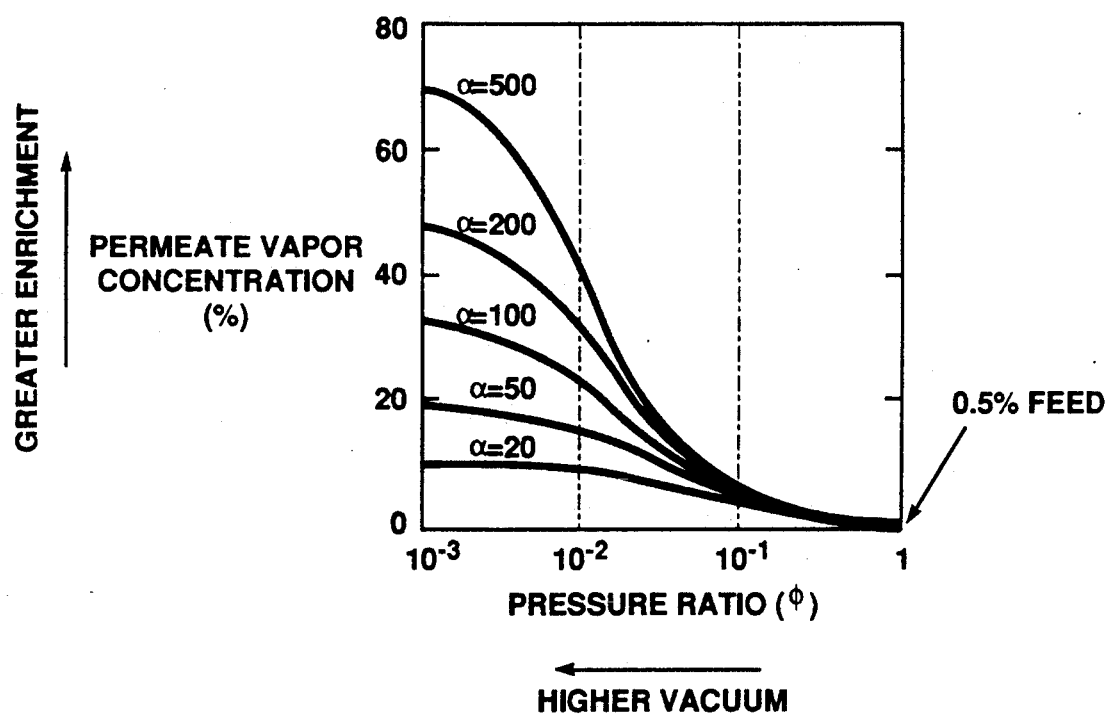
FIG. 1 is a graph showing the relationship between permeate vapor concentration and pressure ratio for membranes of varying selectivities.

The terms condensable and condensable component as used herein refer to fluids below their critical temperatures and having boiling points greater than $-100°$ C. In the event that a mixture containing two or more condensable components is to be treated, the terms condensable and condensable component refer to the more readily condensable component or components.

The term permselective as used herein refers to polymers, or membranes made from those polymers, that exhibit selective permeation for at least one gas or vapor in a mixture over the other components of the mixture, enabling a measure of separation between the components to be achieved.

The term multilayer as used herein means comprising a support membrane and one or more coating layers.

The term selectivity as used herein means the ratio of the permeabilities of gases or vapors as measured with mixed gas or vapor samples under the normal operating conditions of the membrane.

The term residue stream means that portion of the feedstream that does not pass through the membrane.

The term permeate stream means that portion of the feedstream that passes through the membrane.

The term membrane unit as used herein means one or more membrane modules arranged in parallel, so that a portion of the incoming gas stream passes through each one.

The term series arrangement means an arrangement of membrane modules or units connected together such that the residue stream from one module or unit becomes the feedstream for the next.

The term cascade arrangement means an arrangement of membrane modules or units connected together such that the permeate stream from one module or unit becomes the feedstream for the next.

The term membrane array means a set of one or more individual membrane modules or membrane units connected in a series arrangement, a cascade arrangement, or mixtures or combinations of these.

The term product residue stream means the residue stream exiting a membrane array when the membrane separation process is complete. This stream may be derived from one membrane unit, or may be the pooled residue streams from several membrane units.

The term product permeate stream means the permeate stream exiting a membrane array when the membrane separation process is complete. This stream may be derived from one membrane unit, or may be the pooled permeate streams from several membrane units.

All percentages cited herein are by volume unless specifically stated otherwise.

In the process of the present invention, a feed gas stream containing a condensable component is passed through a condensation step and a membrane separation step. The sources of the gas streams to be treated are diverse. Many industrial processes produce waste gas streams containing organic vapors. For example, solvent-containing airstreams are produced as a result of solvent vaporization in the drying of synthetic fibers and films, plastics, printing inks, paints and lacquers, enamels and other organic coatings. Solvents are also used in the preparation of adhesive coatings and tapes. Waste gases containing organic vapors are generated by solvent degreasing operations in the metal and semiconductor industries. Hydrocarbon vapors are released from petroleum storage tanks during transfer operations. Commercial dry-cleaning facilities produce air emissions containing chlorinated hydrocarbons in large quantities; industrial dry-cleaning produces similar emissions containing naphtha. Chlorinated fluorocarbons (CFCs) are emitted to the atmosphere in huge quantities from plants manufacturing polyurethane and other plastic foams. Other sources of extensive CFC pollution are refrigeration operations, air conditioning and fire extinguisher filling and use. The concentration of these streams varies widely, from a few ppm to as high as 40–50% or more organic. Organic vapors that can be handled by the process include, but are not limited to, chlorofluorocarbons such as CFC-11 ($CCl_3F$), CFC-12 ($CCl_2F_2$), CFC-113 ($C_2Cl_3F_3$), CFC-114 ($C_2Cl_2F_4$), CFC-115 ($C_2ClF_5$), HCFC-21 ($CHCl_2F$), HCFC-22 ($CHClF_2$), HCFC-23 ($CHF_3$), HCFC-123 ($C_2HCl_2F_3$), HCFC-142b ($C_2H_3ClF_2$), Halon-1211 ($CF_2ClBr$), Halon-1301 ($CF_3Br$) and Halon-2402 ($C_2F_4Br_2$); chlorinated hydrocarbons, such as tetrachlorethylene, trichlorethylene, methylene chloride, 1,1,1-trichloroethane, 1,1,2-trichloroethane, carbon tetrachloride, chlorobenzene, dichlorobenzene; and non-halogenated hydrocarbons, such as acetone, xylene, ethyl acetate, ethyl benzene, ethyl ether, cyclohexane, ethanol, methanol, and other alcohols, cresols, nitrobenzene, toluene, methyl ethyl ketone, carbon disulfide, isobutanol, benzene, propane, butane, pentane, hexane and octane. Many of these organic-component-containing streams will comprise the organic material in air. Mixtures of organic components in nitrogen are also commonly encountered, because nitrogen is frequently used as a blanketing gas. Streams of organic compounds in other gases, or streams comprising mixtures of organics are also found. For example, hydrogenation reactions in the chemical industry yield off- gas streams containing hydrogen and various hydrocarbons. Treatment of such streams could be carried out using a membrane type preferentially permeable to the hydrocarbon component or a membrane type preferentially permeable to hydrogen. Mixed organic component streams might arise, for example, from natural gas processing or petrochemical refining, where the stream could contain a mixture of methane, ethane, propane, butane and so on. Other streams that could be treated by the process of the invention include those containing sulfur dioxide or ammonia, for example. Numerous processes are being developed to remove acid gases from power plant flue gas. These schemes typically produce gas streams containing 20–90% sulfur dioxide. Claus plants are another source of dilute sulfur dioxide streams. Thus it may be seen that there is an enormous diversity of potential applications for the present process throughout many different industries.

The process of the invention has two main steps, the membrane separation step and the condensation step.

THE MEMBRANE SEPARATION STEP

The membrane separation step preferably uses a membrane that is relatively permeable to a condensable component of the stream, but relatively impermeable to other gases in the stream. Preferred embodiments of the invention employ a composite membrane. This has two layers, a microporous support, which provides mechanical strength, and an ultrathin permselective coating, which is responsible for the separation properties. The microporous support membrane should have a flow resistance that is very small compared to the permselective layer. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to enable it to be coated with a defect-free permselective layer. The support membrane should resist the solvents used in applying the permselective layer. Polymers that may be used to form the microporous support membrane include polysulfone, polyimide, polyvinylidene fluoride, polyamide, polypropylene or polytetrafluoroethylene. The membranes may be prepared by the processes for making finely microporous or asymmetric membranes known in the art. Commercial ultrafiltration membranes, for example, NTU ® 4220 (crosslinked polyimide), or NTU ® 3050 (polysulfone) from Nitto Electric Industrial Company, Osaka, Japan, are also suitable as supports. The thickness of the support membrane is not critical, since its permeability is high compared to that of the permselective layer. However the thickness would normally be in the range 100 to 300 microns, with about 150 microns being the preferred value.

Optionally, the support membrane may be reinforced by casting it on a fabric or paper web. The multilayer membrane then comprises the web, the microporous membrane, and the ultrathin permselective membrane. The web material may be made from polyester or the like. The permselective layer could not be cast directly on the fabric web, because it would penetrate the web material, rather than forming an unbroken surface coating. To maximize the flux of permeating components, the permselective layer should be made very thin. However, the permselective layer must also be free of pinholes or other defects that could destroy the selectivity of the membrane by permitting bulk flow-through of gases. The preferred membrane is one in which the permselective coating is deposited directly on the microporous support. However optional embodiments that include additional sealing or protective layers above or below the permselective layer are also intended to be encompassed by the invention.

The preferred method of depositing the permselective layer is by dip coating. In order to use this method, the polymer material that forms the permselective layer should be a film-forming material that is soluble in an organic solvent. The dip coating method is described, for example, in U.S. Pat. No. 4,243,701 to Riley et al., incorporated herein by reference. For example, a support membrane from a feed roll is passed through a coating station, then to a drying oven, and is then wound onto a product roll. The coating station may be a tank containing a dilute polymer or prepolymer solution, in which a coating, typically 50 to 100 microns thick, is deposited on the support. Assuming a 1% concentration of polymer in the solution, then after evaporation a film 0.5 to 1 micron thick is left on the support.

Alternatively, the permselective membrane may be cast by spreading a thin film of the polymer solution on the surface of a water bath. After evaporation of the solvent, the permselective layer may be picked up onto the microporous support. This method is more difficult in practice, but may be useful if the desired support is attacked by the solvent used to dissolve the permselective material.

The thickness of the permselective layer should normally be in the range 0.1 to 20 microns, preferably 10 microns or less, and more preferably 0.1 to 5 micron.

The form in which the membranes are used in the invention is not critical. They may be used, for example, as flat sheets or discs, coated hollow fibers, or spiral-wound modules, all forms that are known in the art. Spiral-wound modules are a preferred choice. References that teach the preparation of spiral-wound modules are S. S. Kremen, "Technology and Engineering of ROGA Spiral Wound Reverse Osmosis Membrane Modules", in Reverse Osmosis and Synthetic Membranes, S.Sourirajan (Ed.), National Research Council of Canada, Ottawa, 1977; and U.S. Pat. No. 4,553,983, column 10, lines 40-60. Alternatively the membranes may be configured as microporous hollow fibers coated with the permselective polymer material and then potted into a module.

Although the most preferred membrane for use in the process of the invention is a composite membrane, many other types of membrane are also suitable. For example, the membrane may take the form of a homogeneous membrane, a membrane incorporating a gel or liquid layer, or dispersed particulates, or any other form known in the art. Whatever type of membrane is used, the choice of permselective membrane material will depend upon the separation to be performed. To remove an organic vapor as the preferentially permeating component, a number of rubbery polymers could be used. Examples include nitrile rubber, neoprene, silicones rubbers, including polydimethylsiloxane, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers and styrene/ethylene/butylene block copolymers. Particularly preferred rubbers are silicone rubbers. Thermoplastic polyolefin elastomers and block copolymers of polyethers and polyesters would also be useful. To remove sulfur dioxide from a gas stream, more glassy polymers could be used. Suitable polymers include, for example, cellulose and derivatives, such as cellulose diacetate, cellulose triacetate, cellulose nitrate and ethylcellulose; polyvinyl chloride, polyvinylidene fluoride or polyacrylate. Other suitable membranes could be made from polymers or copolymers that combine glassy and rubbery segments. Examples include polyamide-polyether block copolymers, such as those having the formula:

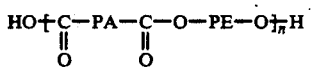

where PA is a polyamide segment, PE is a polyether segment, and n is a positive integer. Such polymers have both high selectivity and high flux for sulfur dioxide. Such membranes are described in detail in copending application number 295,686, now U.S. Pat. No. 4,963,165, incorporated herein by reference. Liquid membranes, such as polyethylene glycol, also exhibit high flux and selectivity for sulfur dioxide and could be used in the process of the present invention. To treat a gas stream containing, for example, ammonia and hydrogen from an ammonia synthesis plant, glassy membranes that are highly selective to hydrogen over ammonia, such as polyimide membranes, could be used. The ammonia would then be concentrated in the residue stream. Ammonia-selective membranes could be made from rubbery materials. Other suitable membranes would be the molten salt membranes described in U.S. Pat. No. 4,758,250 to Air Products.

Embodiments of the invention that use membranes that are selectivity permeable to the non-condensable or less condensable component(s) of the feed gas are also possible. In this case, membranes made from glassy polymers are preferable. Such polymers include, for example, polysulfone, polyethersulfone, polyimides, polycarbonates, brominated polyestercarbonates and the like.

A number of factors have an effect on the performance of the membrane process. Important parameters are the selectivity of the membrane, the pressure drop from the feed to the permeate side of the membrane, the ratio of the permeate and feed pressures, and the ratio of the permeate and feed flows.

To separate the components of the gas stream requires a permselective layer that is preferentially permeable to one component over the others. The mathematical model used to predict permeation behavior is the solution-diffusion model. In simple systems, where the rate-limiting step is diffusion through the membrane, Fick's Law of diffusion leads to the equation $$J = Dk\Delta p, \qquad (1)$$

where J is the membrane flux (cm³(STP)/cm².s.cmHg), D is the diffusion coefficient of the gas or vapor in the membrane (cm²/sec) and is a measure of the gas mobility, l is the membrane thickness, k is the Henry's law sorption coefficient linking the concentration of the gas or vapor in the membrane material to the pressure in the adjacent gas (cm³(STP)/cm³.cmHg), and Δp is the pressure difference across the membrane. The product Dk can also be expressed as the permeability, P, a measure of the rate at which a particular gas or vapor moves through a membrane of standard thickness (1 cm) under a standard pressure difference (1 cmHg).

A measure of the ability of a membrane to separate two components, (1) and (2), of a feedstream is the ratio of their permeabilities, α, called the membrane selectivity, $$\alpha_{2/1} = \frac{P_{(2)}}{P_{(1)}}. \qquad (2)$$

The permselective membranes used in the present invention should preferably have a selectivity for the preferentially permeating component of at least 5, more preferably at least 10, and most preferably at least 20. However, contrary to some previous teachings in the art, extremely high selectivities are not necessary desirable or advantageous, as the examples and accompanying discussion show. Besides the selectivity, other factors determine the degree of enrichment of the condensable component obtained in a membrane process. The first is the extent of removal of condensable component from the feed. When the gas stream enters the membrane module, it immediately begins to lose the condensable component, as it preferentially permeates the membrane. Thus, the concentration of condensable component in the feedstream decreases as it passes through the membrane module. The average concentration of the condensable component on the feed side of the membrane will determine the average concentration of that component on the permeate side of the membrane. If the concentration of the condensable component in the feed is reduced to a small value before it leaves the module, the average feed stream concentration will be low. As a result, the enrichment in the permeate stream will be low also. Thus, as removal from the feedstream is increased, the average concentration of condensable component in the permeate decreases.

A second factor affecting the performance of a membrane system is the pressure of feed and permeate gas streams. The driving force for permeation is the difference between the partial pressures of the components on the feed and permeate sides. However, in addition, the ratio of the feed to the permeate pressures defined as $$\phi = \frac{\text{total permeate pressure } (p'')}{\text{total feed pressure } (p')} \quad (3)$$

is important. The partial pressure of the condensable component on the permeate side of the membrane must never exceed the partial pressure on the feed side, or the permeation process would stop. Thus, even for an infinitely selective membrane, the concentration of condensable component on the permeate side of the membrane can never be greater than $1/\phi$ times the concentration in the feed.

The relationship between pressure ratio and selectivity can be derived from the Fick's law expression for the membrane fluxes, $J_1$ and $J_2$, given as $$J_1 = \frac{P_1 (p'_1 - p''_1)}{l}, \quad (4)$$

and $$J_2 = \frac{P_2 (p'_2 - p''_2)}{l}, \quad (5)$$

where $P_1$ and $P_2$ are the permeabilities of components 1 and 2, $l$ is the membrane thickness, and $p'_1$, $p'_2$ and $p''_1$, $p''_2$, are the partial pressures of the two gases or vapors in the feed and permeate streams, respectively. The total gas pressure is equal to the sum of the partial pressures, i.e., $$p' = p'_1 + p'_2 \text{ (a)} \quad (6)$$
$$p'' = p''_1 + p''_2 \text{ (b)}$$

The volume fractions, $C'_1$ and $C'_2$ of the two components in the feed, and in the permeate, $C''_1$ and $C''_2$ are given by:

$$C_1 = \frac{p'_1}{p'}, \quad C''_1 = \frac{p''_1}{p''}, \text{ (c)} \quad (7)$$

$$C_2 = \frac{p'_2}{p'}, \quad C''_2 = \frac{p''_2}{p''}, \text{ (d)}$$

Combining equations (3-7) then yields the expression $$C''_2 = \frac{1}{2} \cdot \frac{1}{\phi} \left( C_2 + \phi + \frac{1}{\alpha - 1} - \right. \quad (8)$$

-continued $$\left. \sqrt{\left( C_2 + \phi + \frac{1}{\alpha - 1} \right)^2 - \frac{4\phi C_2 \alpha}{\alpha - 1}} \right),$$

At low pressure ratios, i.e., relatively modest permeate vacuums, when $\alpha_{2/1} \gg 1/\phi$, the permeate concentration, $C''_2$, is proportional to the pressure ratio across the membrane and is essentially independent of the membrane's selectivity, $\alpha_{2/1}$. This is the pressure controlled region. At high pressure ratios, i.e., relatively low permeate vacuums, when $\alpha_{2/1} \ll 1/\Phi$, the permeate concentration is proportional to the membrane selectivity and is essentially independent of the pressure ratio across the membrane. This is the membrane selectivity controlled region. There is an intermediate region between these two limiting cases when both the pressure ratio and the membrane selectivity affect the membrane system performance. These three regions are illustrated in FIG. 1, which plots the calculated permeate condensable component concentration, $C''_2$, against pressure ratio, $\phi$, for membranes of selectivities 20, 50, 100, 200 and 500.

The pressure drop across the membrane can be achieved by pressurizing the feed, by evacuating the permeate or by both. If the membrane separation step follows the condensation step, and the condensation step includes compression, then the feed to the membrane step may already be at a high pressure compared with atmospheric, such as 1-10 atmospheres. Therefore, drawing a vacuum on the permeate side may not be necessary. If the membrane separation step precedes the condensation step, it may be preferable to keep the feed at atmospheric pressure and to lower the permeate pressure by means of a vacuum pump. At pressure ratios between 0.01 and 0.001, very large differences in performance with differing selectivity can be achieved. In large-scale operations, the cost of maintaining a hard vacuum on the permeate side may be very high. It may be practically preferable to operate with permeate pressures above 1 cmHg. Therefore, a value of roughly 0.005 is probably the preferable lower limit for practical pressure ratios in an industrial setting. This would correspond to a feed pressure of 10 atmospheres and a permeate pressure of 4 cmHg, or a feed pressure of 5 atmospheres and a permeate pressure of 2 cmHg, or a feed pressure of 1 atmosphere and a permeate pressure of 4 mmHg. FIG. 1 shows that for pressure ratios ranging from 0.1 to 1, the separation achieved is modest and is largely independent of the membrane selectivity, i.e., the separation is pressure ratio controlled. The preferred operating zone for the processes of the invention, therefore, is generally in the middle region of FIG. 1, where a good separation can be achieved by combining a membrane with a good, but not excessively high, selectivity, typically in the range 5-200, with a pressure ratio in an economically sustainable range, such as 0.005-0.5. This limits the maximum enrichment of condensable component obtained in a single-stage industrial system to this range.

The ratio of the permeate flow to the feed flow is called the stage cut. The degree of depletion of the more permeable component from the feed depends on the stage cut. When a membrane system is operated at a high stage cut, the feed gas becomes substantially depleted in the more permeable components. As a result, the average concentration of the more permeable component seen by the membrane is substantially lower than the initial feed gas concentration. The result is a fall in the concentration of the more permeable component in the permeate stream. Suppose that a stream contains 4% condensable component and it is desired to reduce the concentration to 0.5%. If only the condensable component permeated the membrane, then the permeate flow would be pure condensable component, and would be 3.5% of the total feed flow. Thus, the minimum stage cut to achieve this degree of separation would be 3.5%. In practice, the stage cut will always be higher than this, because the other gases in the feed will also permeate the membrane to some extent. However, for the process to be efficient, the stage cut should be kept low, preferably below 40% and most preferably below 30%.

The membrane separation step should preferably be designed to achieve removal of at least 50% of the condensable component present in the feed to the membrane system, more preferably at least 70% and most preferably at least 80%.

THE CONDENSATION STEP

The condensation step may involve chilling, compression or a combination of these. The goal of the condensation step is to bring the gas stream to the dewpoint of the condensable component, so that a portion of the condensable component will condense out of the gas stream in liquid form. The amount of the condensable component that can be removed from the gas stream in this way will depend on the boiling point of the condensable component, its concentration in the feed, and the operating conditions under which the condensation is performed.

The gas stream to be treated by the condensation step should preferably contain above about 10-20% of the saturation concentration of the condensable component at ambient temperatures and pressures. Very dilute streams are difficult to treat efficiently. Preferably the gas stream will pass first through a compressor, where it is pressurized to a pressure in the range 1-15 atmospheres. Compression above about 15 atmospheres, and particularly above 20 atmospheres is less desirable, because of the energy demands and consequent high cost. After compression, the gas is cooled, for example by running it through a condenser. The condenser may be water cooled, or may employ refrigerants that can take the gas down to lower temperatures. In cases where the condensable component is relatively concentrated in the gas stream, and where the boiling point is relatively high, then chilling without compression may be adequate to recover the bulk of the condensable material. As far as the costs and energy requirements of chilling are concerned, several limits are discernable. Ideally, although it will frequently not be possible, the chiller temperature should be no lower than about 10° C., because this permits simple water cooling. The second limit, also very desirable, is that the chiller temperature be no lower than 0° C., because ice formation in the condenser is then avoided. Many, if not most, streams to be treated will contain water vapor. If the condenser temperature is below 0° C., periodic defrosting or dehydration pre-treatment will always be necessary. The third limit occurs at around −45° C. Temperatures down to about −45° C. should be possible to reach in a single-stage chilling operation, but costs will be relatively high compared with the two preferred options above. The fourth, and least preferred, mode of operation is to chill down to as low as −100° C. or below. This will normally require at least two chillers operating at progressively lower temperatures. The increase in energy requirements and costs is now sharp in comparison with the preferred modes. The hybrid membrane separation/condensation processes taught herein can often be tailored so that the condensation step can be performed above 0° C. This is a major advantage of such processes.

The fraction of the condensable component remaining in the condenser vent gas after the condensation step depends on the vapor/liquid equilibrium at the operating conditions under which the condensation step is performed. From the economic and energy consumption viewpoints, it is preferable that the dewpoint be reached at a combination of modest pressures and temperatures. If the dewpoint is reached at 2 atmospheres and 10° C., for example, then compressing the stream to 10 atmospheres and cooling will remove approximately 80% or more of the organic vapor. If the concentration and boiling point are such that the stream is already saturated at atmospheric pressure and ambient temperature, then compressing the stream to 10 atmospheres will remove at least 90% or more of the organic vapor. It is theoretically possible to obtain 95% or more removal of any volatile component from the feed gas stream by creating appropriate conditions of high pressure and low temperature. In practice, the economics of achieving extremely high pressures and extremely low temperatures will limit the performance of the condensation step. It is preferable that the condensation step be designed to remove at least 50% or more of the condensable component present in the feed to the condenser. Most preferably, the condensation step should be designed to remove at least 70% or more of the condensable component present in the feed to the condenser. Operation under extreme conditions to achieve 90% or more condensable removal is usually unnecessary, because of the presence of the membrane step. If the condensation step necessitates cooling to below 0° C., and the gas stream contains water vapor, then optionally the condensation step may use two chillers in series. The first chiller is maintained at a temperature close to 0° C., and removes most of the entrained water. The second chiller is maintained at the lower temperature necessary to remove a substantial fraction of the condensable component. Some water vapor will inevitably pass into the second chiller but the use of the first chiller will significantly reduce the need for defrosting the second. Alternatively, the condensation step may include another type of dehydration process through which the gas stream passes before it enters the condenser.

The overall degree of condensable removal and recovery that can be achieved by the hybrid process of the invention will depend on the combined effects of the condensation step and the membrane separation step. For example, suppose the condensation step removes 50% of the condensable component of the feed gas. If the condensation step is followed by a membrane separation step that can remove 80% of the condensable component reaching it, then the total removal obtained by the process is 90%. If the condensation step removes 80%, and is followed by a membrane separation step that also removes 80%, then the total removal obtained by the process is 96%. If the condensation step removes 80% and the membrane separation step 90%, the total removal is 98%.

The above discussion is intended to show that the process can be tailored to achieve a desired degree of condensable removal in a highly efficient manner. The tailoring can be done by comparing estimates of the energy and dollar costs with several sets of system configurations and operating conditions. For example, the costs and energy requirements to achieve 95% total removal, using an initial condensation step removing 50, 75 or 90% of the condensable component, followed by a membrane separation step removing 90, 80 or 50% of the remaining condensable component, could be compared.

Figure 2:
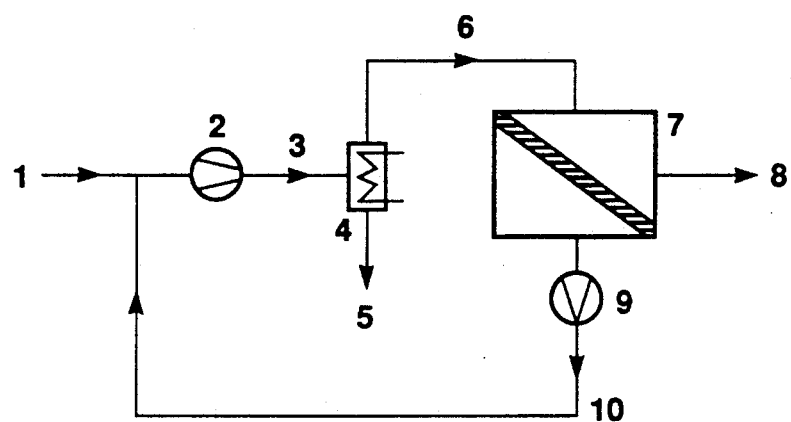
FIG. 2 is an embodiment of the invention using a condensation step, involving compressing and cooling the gas stream, followed by a membrane separation step using a single membrane unit.
Figure 3:
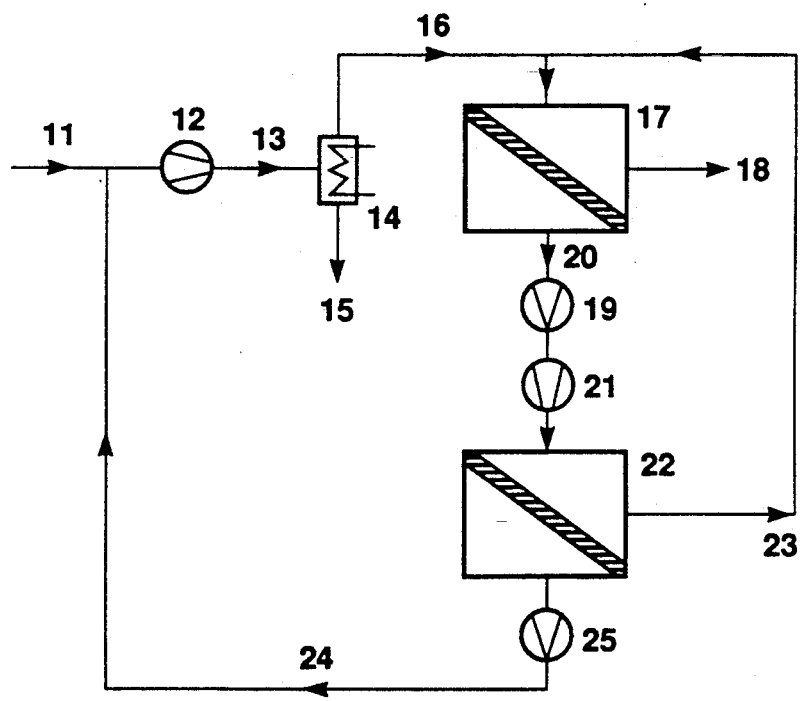
FIG. 3 is an embodiment of the invention using a condensation step, involving compressing and cooling the gas stream, followed by a membrane separation step using a two-stage cascade arrangement.

Many different embodiments of the process are possible. FIGS. 2–7 show some representative examples. The process of the invention may be configured so that the condensation step is followed by the membrane separation step, or vice versa. If the concentration of the condensable component in the gas stream is above about 20–50% of the saturation concentration under ambient conditions, then it is normally preferable to subject the incoming gas stream first to the condensation step and then to the membrane separation step. A basic embodiment of the invention according to this scheme is shown in FIG. 2. Referring now to this figure, incoming gas stream, 1, containing a condensable component, is passed through compressor, 2, to form compressed gas stream, 3. This stream passes through condenser, 4, to yield a condensed liquid stream of the condensable component, 5. The non-condensed fraction, 6, of the gas stream passes to membrane separation unit, 7, which contains membranes selectively permeable to the condensable component. The non-permeating, residue stream, 8, is thus depleted in the condensable component. A pressure difference across the membrane is provided by optional vacuum pump, 9. If the feed gas to the membrane is at high pressure, then the vacuum pump may not be necessary because a sufficient pressure drop across the membrane already exists. The permeate stream, 10, is enriched in the condensable component and can be returned and mixed with the incoming gas stream for recompression and condensation. An alternative embodiment of the invention, employing a membrane array consisting of a two-stage cascade, is shown schematically in FIG. 3. This type of process could be used, for example, when the vent stream from the condensation process step contains the condensable component in a low concentration. The second stage of the membrane array minimizes the amount of non-condensable component recirculated to the condenser system. Referring now to FIG. 3, incoming gas stream, 11, containing a condensable component, is passed through compressor, 12, to form compressed gas stream, 13. This stream passes through condenser, 14, to yield a condensed liquid stream of the condensable component, 15. The non-condensed fraction, 16, of the gas stream passes to first membrane separation unit, 17, which contains membranes selectively permeable to the condensable component. The non-permeating, residue stream, 18, is thus depleted in the condensable component. A pressure difference across the membrane is provided by optional vacuum pump, 19. The permeate stream, 20, is enriched in the condensable component, but still contains significant amounts of non-condensables. The permeate from the first membrane unit is therefore fed to second membrane unit, 22, after recompression in compressor, 21. A pressure difference across the second membrane unit is provided by vacuum pump, 25. The permeate stream, 24, from the second membrane unit is now highly concentrated in the condensable component and can be returned and mixed with the incoming gas stream for recompression and condensation. The residue stream, 23, from the second membrane unit, depleted in the condensable component compared with stream 20, may optionally be recycled to the feed side of the first membrane unit. In this way the process produces only two streams, the liquid stream of the condensable component, 15, and the relatively clean residue stream, 18.

Figure 4:
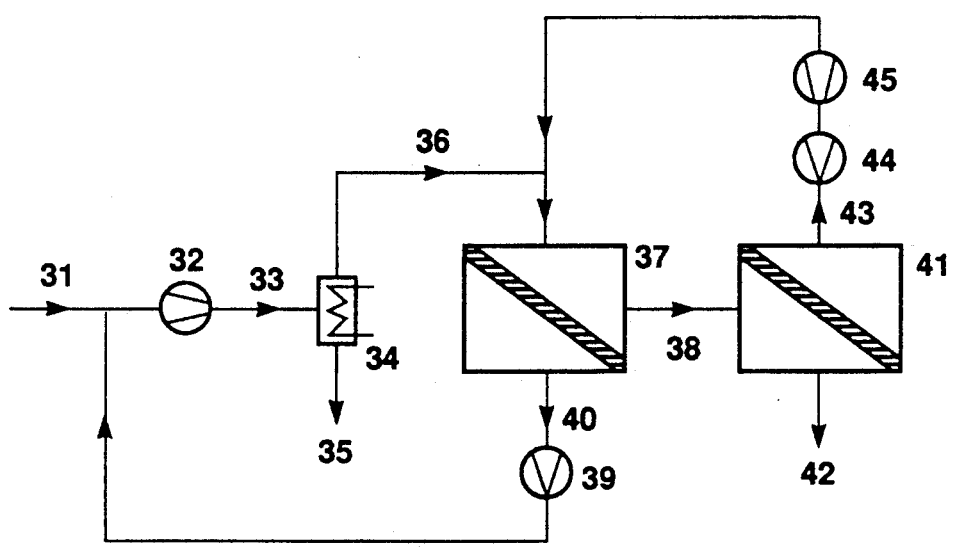
FIG. 4 is an embodiment of the invention using a condensation step, involving compressing and cooling the gas stream, followed by a membrane separation step using a two-step series arrangement.

A second alternative embodiment of the invention, employing a membrane array consisting of a two-step series arrangement, is shown schematically in FIG. 4. This type of process could be used, for example, when the vent stream from the condensation process step contains the condensable component in a relatively high concentration and if the desired removal by the membrane separation unit is high. Referring now to this figure, incoming gas stream, 31, containing a condensable component, is passed through compressor, 32, to form compressed gas stream, 33. This stream passes through condenser, 34, to yield a condensed liquid stream of the condensable component, 35. The non-condensed fraction, 36, of the gas stream passes to first membrane separation unit, 37, which contains membranes selectively permeable to the condensable component. A pressure difference across the membrane is provided by optional vacuum pump, 39. The permeate stream, 40, is enriched in the condensable component and can be returned and mixed with the incoming gas stream for recompression and condensation. The non-permeating, residue stream, 38, is depleted in the condensable component compared with stream 36, but still contains too much of the condensable component for discharge. Stream 38 is therefore fed to second membrane unit, 41. A pressure difference across the second membrane unit is provided by vacuum pump, 44. The residue stream, 42, from the second membrane unit is now sufficiently depleted in the condensable component for discharge. The permeate stream, 43, from the second membrane unit, enriched in the condensable component compared with stream 38, may optionally be recompressed by compressor, 45, and recycled to the feed side of the first membrane unit. In this way the process produces only two streams, the liquid stream of the condensable component, 35, and the relatively clean residue stream, 42.

Figure 5:
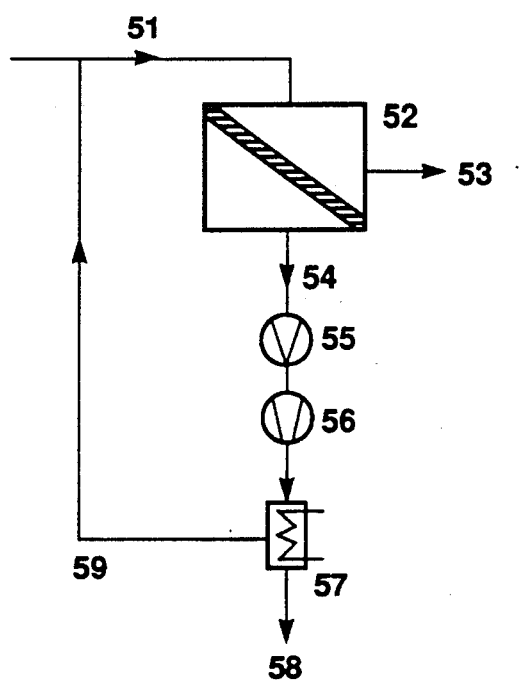
FIG. 5 is an embodiment of the invention using a membrane separation step with a single membrane unit, followed by a condensation step, involving compressing and cooling the gas stream.

If the concentration of the condensable component in the gas stream is below about 10–20% of the saturation concentration under ambient conditions, then it is generally preferable to subject the incoming gas stream first to the membrane separation step and then to the condensation step. A basic embodiment of the invention according to this scheme is shown in FIG. 5. Referring now to this figure, gas stream, 51, containing a condensable component, is passed to membrane separation unit, 52, which contains membranes selectively permeable to the condensable component. The non-permeating, residue stream, 53, is thus depleted in the condensable component. A pressure difference across the membrane is provided by vacuum pump, 55. The permeate stream, 54, is enriched in the condensable component. This stream is passed through compressor, 56, and thence to condenser, 57, to yield a condensed liquid stream of the condensable component, 58. The non-condensed fraction, 59, of the gas stream is returned to the feed side of the membrane unit. By analogy with the embodiments of FIGS. 2, 3 and 4, it may be seen that alternatives to the scheme of FIG. 5 are also possible. If the incoming gas stream is very dilute, it may be necessary to pass it through an array of two membrane stages in a cascade arrangement to concentrate it sufficiently for treatment in the condensation step. If the degree of separation obtained by a single membrane unit is inadequate, it may be necessary to subject the residue from that membrane unit to treatment in a second membrane step, in series with the first, before the gas stream can be discharged. As with the designs of FIGS. 3 and 4, recycle of streams within the membrane separation step can be performed. For example, the residue stream from the second membrane unit in the cascade arrangement may be returned to feed side of the first unit. The permeate stream from the second membrane unit in the series arrangement can be returned to the feed side of the first unit.

Figure 6:
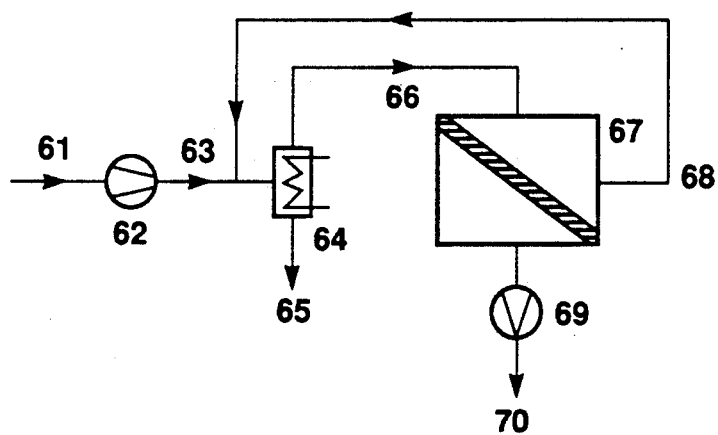
FIG. 6 is an embodiment of the invention using a condensation step, involving compressing and cooling the gas stream, followed by a membrane separation step using a single membrane unit, selectively permeable to a non-condensable component of the gas stream.

All of the embodiments described above use membranes that are selectively permeable to the condensable component of the gas stream. Embodiments in which the membranes used are selectively permeable to a non-condensable component of the gas stream are also possible. If such membranes are used, the residue stream will be enriched in the condensable component by removal of one or more other components through the membrane into the permeate stream. Using such membranes may offer an advantage in cases where the concentration of the condensable component in the feed to the membrane system is high. If condensable-selective membranes were used, a substantial portion of the feed gas would have to permeate the membrane in order to remove a significant part of the condensable component. The large permeate stream thus created would have to be recompressed, leading to increased energy requirements. Membranes highly selective for non-condensable components could remove a substantial fraction of the non-condensables. Because the residue gas remains at approximately the same pressure as the feed, the residue could be fed directly back into the stream entering the condenser, without the need for recompression. FIG. 6 shows such an embodiment. Referring now to this figure, the incoming gas stream, 61, containing a condensable component, is passed through compressor, 62, to form compressed gas stream, 63. This stream passes through condenser, 64, to yield a condensed liquid stream of the condensable component, 65. The non-condensed fraction, 66, of the gas stream passes to membrane separation unit, 67, which contains membranes selectively permeable to the non-condensable component. The non-permeating, residue stream, 68, is thus enriched in the condensable component, and can be returned to the condenser inlet without recompression. A pressure difference across the membrane is provided by optional vacuum pump, 69.

Figure 7:
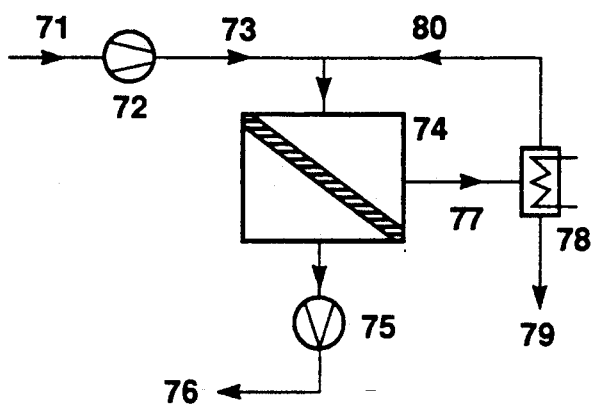
FIG. 7 is an embodiment of the invention using a membrane separation step with a single membrane unit, selectively permeable to a non-condensable component of the gas stream, followed by a condensation step, involving compressing and cooling the gas stream.

The permeate stream, 70, is depleted in the condensable component and can be discharged or reused as desired. Variations of this embodiment include those in which the single membrane unit shown in FIG. 6 is replaced by a cascade or a series arrangement. FIG. 7 shows an embodiment also using non-condensable selective membranes, in which the membrane separation step precedes the condensation step. Referring now to this figure, the incoming gas stream, 71, containing a condensable component, is passed through compressor, 72, to form compressed gas stream, 73, and thence to membrane separation unit, 74, which contains membranes selectively permeable to the non-condensable component. The non-permeating, residue stream, 77, is thus enriched in the condensable component, and is passed to condenser, 78, to yield a condensed liquid stream of the condensable component, 79. The non-condensed fraction, 80, of the gas stream from the condenser is returned to the feed side of the membrane unit without recompression. A pressure difference across the membrane is provided by optional vacuum pump, 75. The permeate stream, 76, is depleted in the condensable component and can be discharged or reused as desired. As with the embodiment of FIG. 6, variations in which the single membrane unit shown in FIG. 7 is replaced by a cascade or a series arrangement, are possible.

Processes of the type shown in FIGS. 6 and 7 are particularly suited to the treatment of volatile, but condensable, component stream containing minor amounts of relatively non-condensable gases. For example, in the production of vinyl chloride, off gases are produced containing 90% or more vinyl chloride contaminated with carbon dioxide, nitrogen and oxygen. Membranes preferentially permeable to carbon dioxide, nitrogen and oxygen could be used to leave behind a an essentially pure vinyl chloride residue stream.

Figure 8:
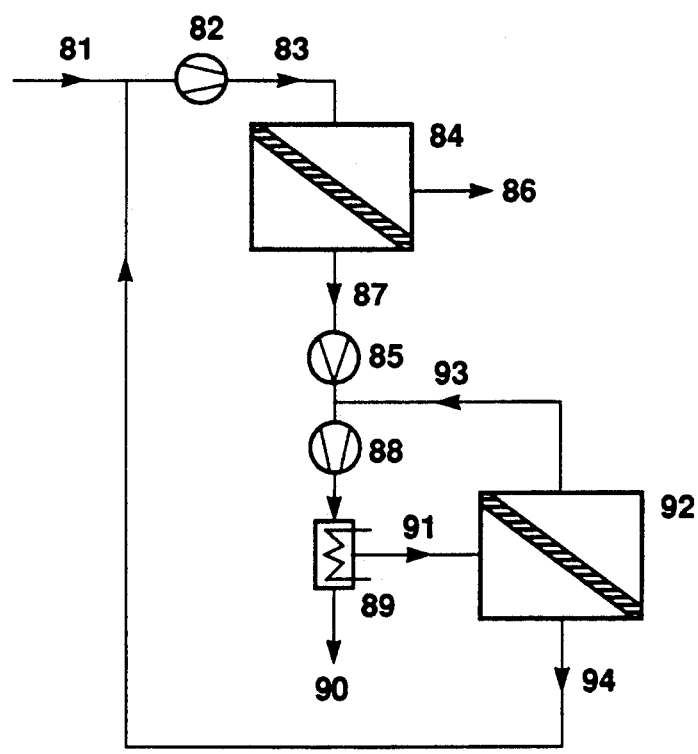
FIG. 8 is an embodiment of the invention where a condensation step is performed between two membrane separation steps.

The process of the invention may also be carried out by using two discrete membrane separation steps, between which the condensation step is performed. Process designs of this type enable different membrane materials to be used in the two membrane separation steps. Also the membrane area used in the two steps, and hence the gas processing capacity, can be different. An embodiment of this type is shown in FIG. 8. Referring now to this figure, feed gas stream, 81, containing a condensable component, passes through optional compressor, 82, to form compressed gas stream, 83. This stream is passed to first membrane separation unit, 84, which contains membranes selectively permeable to the condensable component. The non-permeating, residue stream, 86, is thus depleted in the condensable component. A pressure difference across the membrane is provided by optional vacuum pump, 85. The permeate stream, 87, is enriched in the condensable component. This stream is passed through compressor, 88, and thence to condenser, 89, to yield a condensed liquid stream of the condensable component, 90. The non-condensed fraction, 91, of the gas stream is passed to second membrane separation unit, 92. The residue stream, 94, from this unit is returned to the feed side of the first membrane unit. The permeate stream, 93, is sufficiently enriched to be returned to the condensation step. As with the other embodiments described above, first and second membrane arrays may be used instead of single membrane units, if necessary. Also, similar process designs to that shown in FIG. 8 can be devised using membranes that are selective for the non-condensable component.

A particular advantage of the process of the invention relates to the driving forces for the individual condensation and membrane separation processes. Condensation is frequently facilitated by at least a moderate degree of compression of the gas stream. Compression of the gas stream to be treated also facilitates the membrane separation step. If the feed to the membrane system is at high pressure compared to atmospheric, this may completely obviate the need for a vacuum pump or other means of lowering the pressure on the permeate side.

Representative examples of applications for the process of the invention include:

1. HYDROCARBON EMISSIONS FROM OIL AND PETROLEUM STORAGE TANKS

Hydrocarbons emitted from crude oil and gasoline storage tanks, either during tank emptying and filling operations, or from leaks through the seals of floating roof storage systems, are a significant waste of energy resources. The EPA reports such emissions at about one million tons per year. Typical emissions from storage tanks are $C_3$ through $C_6$ hydrocarbons. The total capacity of refining storage systems is on the order of 35 to 50 million tons of crude oil and 20 to 30 million tons of gasoline. The hydrocarbon lost per year thus amounts to 1-2% of the storage capacity.

Streams produced during the storage and transfer of volatile petroleum products typically contain hydrocarbons in air or hydrocarbons in nitrogen. These streams usually contain 20-50% hydrocarbons. The composition of an airstream contaminated with gasoline vapor might typically be approximately as follows:

| Component | Percentage |
|---|---|
| $O_2$ | 12.6 |
| $N_2$ | 47.4 |
| $C_3$ | 2 |
| $C_4$ | 19 |
| $C_5$ | 15 |
| $C_6$ | 4 |

The hydrocarbon content of such a stream could be reduced from 40% to 0.5% by a process such as that of FIG. 2.

2. CFC RECOVERY

Because of their high value and environmental impact, treatment of CFC-laden emissions represents a major immediate potential application for the process of the invention. Large sources of CFC emissions include air conditioning and refrigeration (mostly CFC-11 and CFC-12), plastic foam manufacture (mostly CFC-11 and CFC-12) and solvent degreasing (mostly CFC-113). Emissions of all types of CFCs also arise from CFC manufacture, storage and transfer operations. Emissions from manufacture, storage and transfer, from foam blowing, and from solvent operations, are all possible candidates for the presently proposed treatment methods. The total volume of all CFC emissions from all sources in the United States was at least 0.7 million tons in 1980 and has grown substantially over recent years. In CFC treatment applications, a very high degree of removal from the stream that is to be discharged would be desirable. A process of the type shown in FIG. 4 could, therefore, be used. The condensation step might typically remove 80-90% of the CFC, and each membrane step could also remove 90% or more of the remaining CFC. Thus the process of the invention could reduce the CFC content of a stream from 10% to 0.01%, or from 20% to 0.02%, for example.

3. CHLORINATED SOLVENT RECOVERY

Airstreams contaminated with chlorinated solvents are also widely encountered throughout large and small industries. The streams arise from chemical manufacture and processing operations, film and laminate preparation, coating and spraying, solvent degreasing, industrial and commercial dry cleaning and many other sources. Storage and handling of all these solvents gives rise to contaminated airstreams similar to those discussed in the sections above. One specific example is methylene chloride, which is widely used as a standard solvent in chemical reactions, for degreasing and cleaning of metal parts in many industries, in casting operations, and as a blowing agent in foam production. Methylene chloride has a boiling point of 40° C. Condensation processes are already fairly widely used for methylene chloride recovery, but nevertheless annual emissions of methylene chloride in the U.S. are believed to be in the region of 200,00-300,000 tons. Retrofitting of existing condensation processes with an additional membrane separation unit could reduce emissions from the condensation process by 90% or more.

The invention is now further illustrated by the following examples, which are intended to be illustrative of the invention, but are not intended to limit the scope or underlying principles in any way.

EXAMPLES

The examples are in four groups. The first group covers the results obtained in a series of experiments carried out according to the general procedure described below. These experiments were performed to determine that separation of organic vapors from gas streams, with adequate selectivity, can be achieved. The experiments were performed with a single membrane module, usually operated at low stage cut, to optimize the concentration of organic vapor in the permeate stream. There was no attempt made in these simple experiments to control the concentration of organic in the residue stream. Having demonstrated that adequate separation is possible, the other groups of examples take representative separations and illustrate how hybrid systems for carrying out the process of the invention can be designed.

GROUP 1 EXAMPLES

Experimental Procedure for Single Module Experiments

All sample feedstreams were evaluated in a laboratory test system containing one spiral-wound membrane module. The tests were run at room temperature. The air in the feed cycle was replaced with nitrogen from a pressure cylinder prior to the experiment. Nitrogen was continuously fed into the system during the experiment to replace the nitrogen lost into the permeate. Organic vapor was continuously fed into the system by either pumping liquid organic into the residue line using a syringe pump and evaporating the organic using additional heating, or sending a bypass stream of the residue through a wash bottle containing the liquid organic. The feed and residue organic concentrations were determined by withdrawing samples from the appropriate lines by syringe and then subjecting these to gas chromatograph (GC) analysis. A small bypass stream was used to take the samples at atmospheric pressure instead of the elevated pressure in the lines. Two liquid nitrogen traps were used to condense the organic contained in the permeate stream. A non-lubricated rotary-vane vacuum pump was used on the permeate side of the module. The permeate pressure used in the experiments was in the range 1-5 cmHg. The samples from the permeate stream were taken using a detachable glass vessel constantly purged with a bypass stream of the permeate. Upon sampling, the vessel was detached and air was allowed to enter the vessel. The concentration in the vessel was determined by gas chromatography. The permeate concentration was then calculated from the relationship:

$$\text{permeate conc.} = \text{conc. in vessel} \times \left(\frac{76 \text{ cmHg}}{\text{permeate pressure (cmHg)}}\right). \quad (18)$$

The procedure for a test with the system was as follows:
1. The system was run without organic under maximum permeate vacuum to replace the air in the loop with nitrogen.
2. The nitrogen permeate flow rate was determined by measuring the vacuum pump exhaust flow rate. This provided a quality check on the module.
3. The feed flow, feed pressure and permeate pressure were adjusted to the desired values. The cold trap was filled with liquid nitrogen.
4. The organic input was started and the feed concentration was monitored with frequent injections into the GC. The permeate pressure was adjusted if necessary.
5. The system was run until the feed analysis showed that steady state had been reached.
6. All parameters were recorded and a permeate sample was taken and analyzed.
7. Step 6 was repeated after 10-20 minutes. The feed concentration was monitored after each parameter change to ensure steady state had been reached.

EXAMPLE 1

Figure 9:
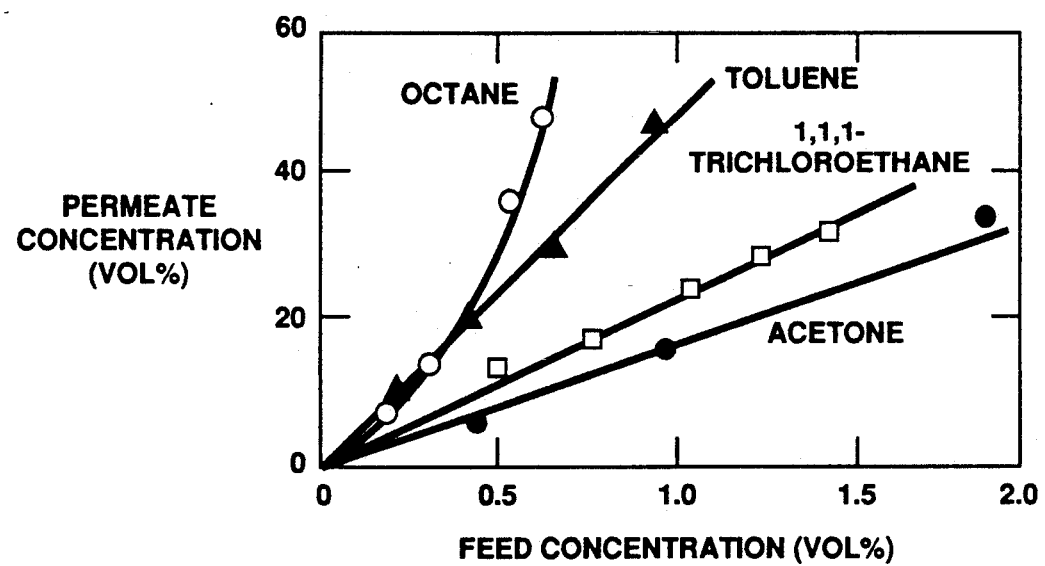
FIG. 9 is a graph showing the relationship between feed and permeate concentrations of acetone, 1,1,1-trichloroethane, toluene and octane.

The experimental procedures described above were carried out using a membrane module containing a composite membrane with an area of 1,100 cm$^2$. The feedstream comprised nitrogen and acetone, the acetone concentration in the feed varying from about 0.4% to 2%. A plot of acetone concentration in the feed against acetone concentration in the permeate is given by the lowest curve in FIG. 9. Typically the permeate was enriched about 18-fold compared with the feed. A feedstream containing 0.45% acetone yielded a permeate containing 8% acetone. The selectivity for acetone over nitrogen was found to be in the range 15-25, depending on the feed concentration of acetone and other operating parameters.

EXAMPLE 2

The experimental procedures described above were carried out using a membrane module containing a composite membrane with an area of 1,100 cm$^2$. The feedstream comprised nitrogen and 1,1,1-trichloroethane, the trichloroethane concentration in the feed varying from about 0.5% to 1.5%. A plot of trichloroethane concentration in the feed against trichloroethane concentration in the permeate is given by the second lowest curve in FIG. 9. Typically the permeate was enriched about 24-fold compared with the feed. A feedstream containing 0.5% trichloroethane yielded a permeate containing 13% trichloroethane.

EXAMPLE 3

The experimental procedures described above were carried out using a membrane module containing a composite membrane with an area of 1,100 cm$^2$. The feedstream comprised nitrogen and toluene, the toluene concentration in the feed varying from about 0.2% to 1%. A plot of toluene concentration in the feed against toluene concentration in the permeate is given by the third curve in FIG. 9. Typically the permeate was enriched about 48-fold compared with the feed. A feedstream containing 0.65% toluene yielded a permeate containing 30% toluene.

EXAMPLE 4

The experimental procedures described above were carried out using a membrane module containing a composite membrane with an area of 1,100 cm$^2$. The feedstream comprised nitrogen and octane, the octane concentration in the feed varying from about 0.1% to 0.6%. A plot of octane concentration in the feed against octane concentration in the permeate is given by the uppermost curve in FIG. 9. Typically the permeate was enriched at least 50-60 fold compared with the feed. A feedstream containing 0.3% octane yielded a permeate containing 14% octane.

EXAMPLE 5

Figure 10:
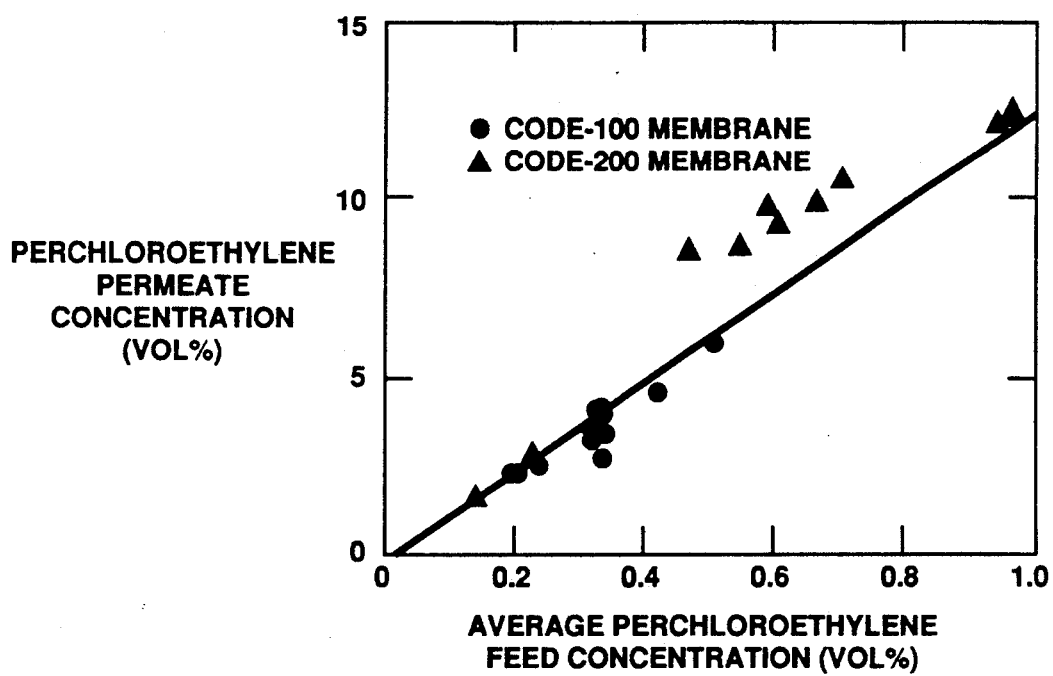
FIG. 10 is a graph showing the relationship between feed and permeate concentrations of perchloroethylene.

The experimental procedures described above were carried out using two different membrane modules containing composite membranes with different rubbers as the permselective layer, but both with membrane areas of 3,200 cm$^2$. The feedstream comprised nitrogen and perchloroethylene, the perchloroethylene concentration in the feed varying from about 0.2% to 0.8%. A plot of perchloroethylene concentration in the feed against perchloroethylene concentration in the permeate is given in FIG. 10. The open circles are for one module; the triangles for the other. Typically the permeate was enriched at least 10-12 fold compared with the feed. A feedstream containing 0.2% perchloroethylene yielded a permeate containing 2.2% perchloroethylene. A feedstream containing 0.5% perchloroethylene yielded a permeate containing 8.3% perchloroethylene.

EXAMPLE 6

Figure 11:
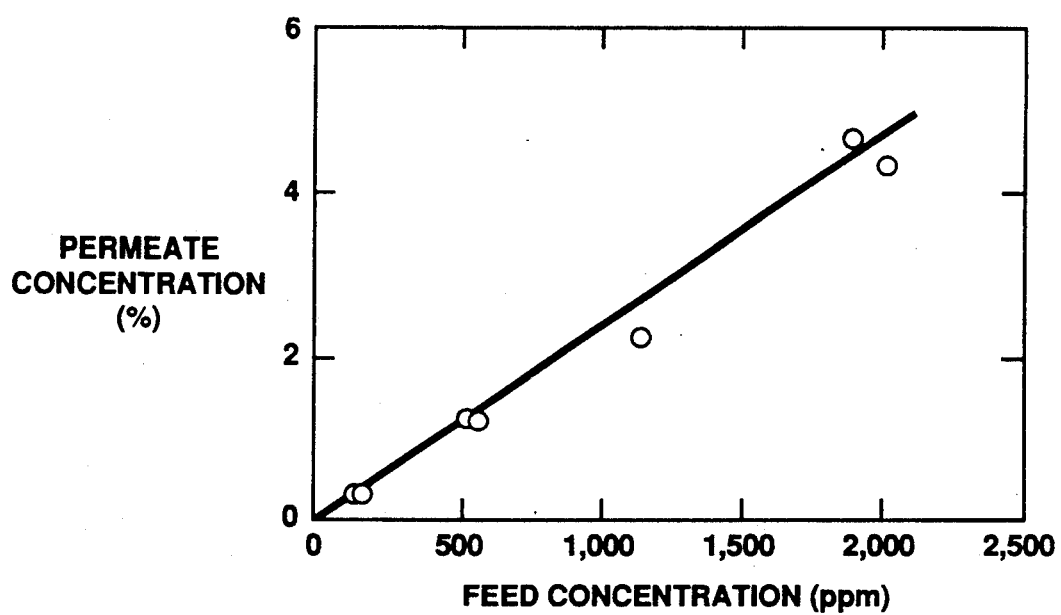
FIG. 11 is a graph showing the relationship between feed and permeate concentrations of CFC-11 at low CFC feed concentrations.

The experimental procedures described above were carried out using a feedstream containing CFC-11 (CCl$_3$F) in nitrogen in concentrations from 100-2,000 ppm. The module contained a composite membrane with an area of approximately 2,000 cm$^2$. The results are summarized in FIG. 11. The calculated CFC/N$_2$ selectivity of the module increased slightly from 22 at 100 ppm to 28 at 2,000 ppm.

EXAMPLE 7

Figure 12:
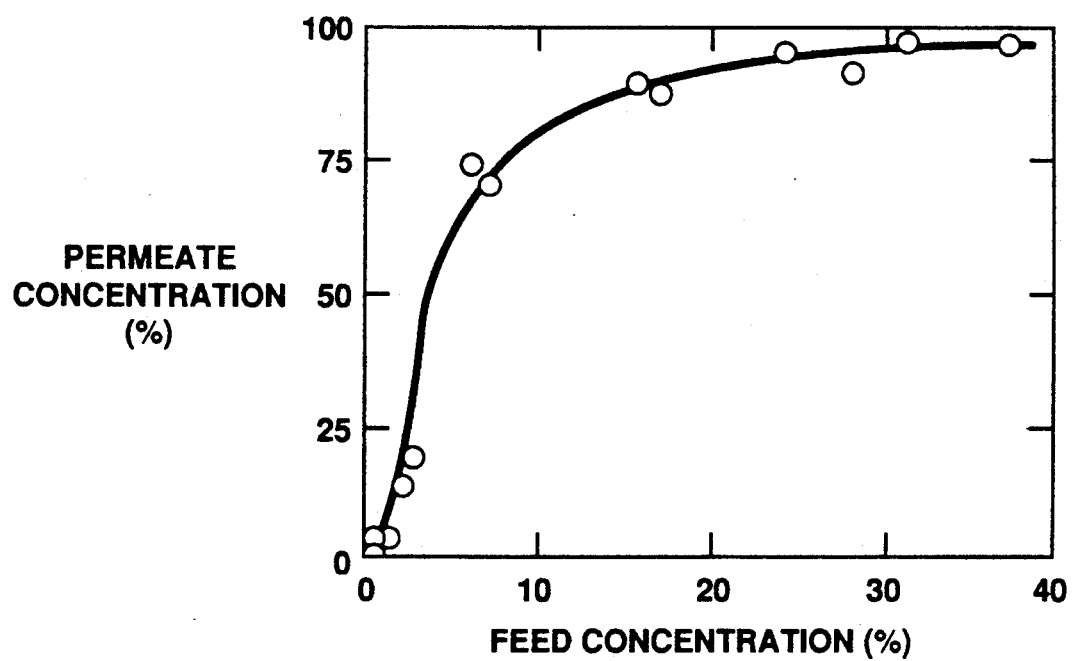
FIG. 12 is a graph showing the relationship between feed and permeate concentrations of CFC-11 at CFC feed concentrations up to about 35 vol %.

The experimental procedures described were carried out using a feedstream containing CFC-11 (CCl$_3$F) in nitrogen in concentrations from 1-35%. The module contained a composite membrane with an area of approximately 2,000 cm$^2$. The results are summarized in FIG. 12. The calculated CFC/N$_2$ selectivity of the module increased from 30 at 1 vol % to 50 at 35 vol %. This effect may be attributable to plasticization of the membrane material by sorbed hydrocarbon. Both hydrocarbon and nitrogen fluxes increased with increasing hydrocarbon feed concentration. The selectivity for CFC-11 over nitrogen was found to be in the range 30-50.

EXAMPLE 8

Figure 13:
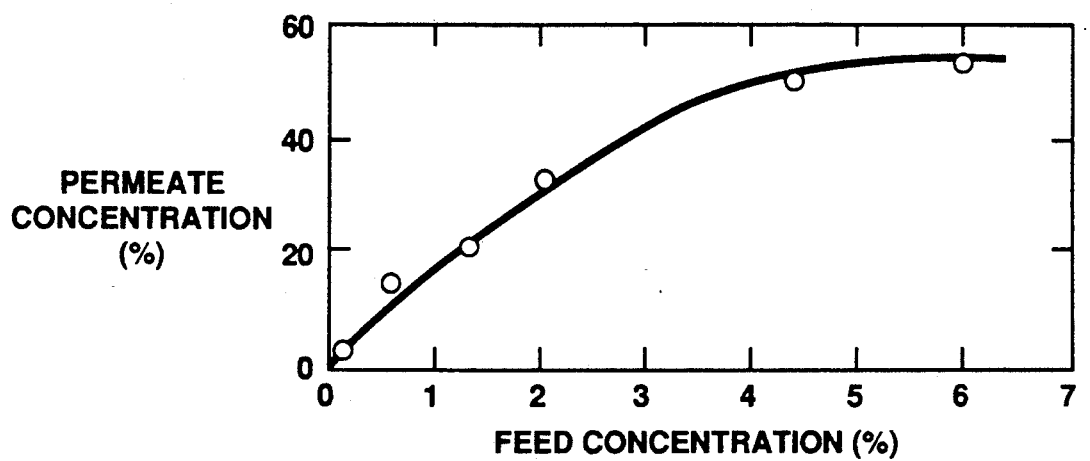
FIG. 13 is a graph showing the relationship between feed and permeate concentrations of CFC-113 at CFC feed concentrations up to about 6 vol %.

The experimental procedures described were carried out using a feedstream containing CFC-113 (C$_2$Cl$_3$F$_3$) in nitrogen in concentrations from 0.5-6%. The module contained a composite membrane with an area of approximately 2,000 cm$^2$. The results are summarized in FIG. 13. The calculated $CFC/N_2$ selectivity of the module remained constant at about 25 over the feed concentration range.

EXAMPLE 9

Figure 14:
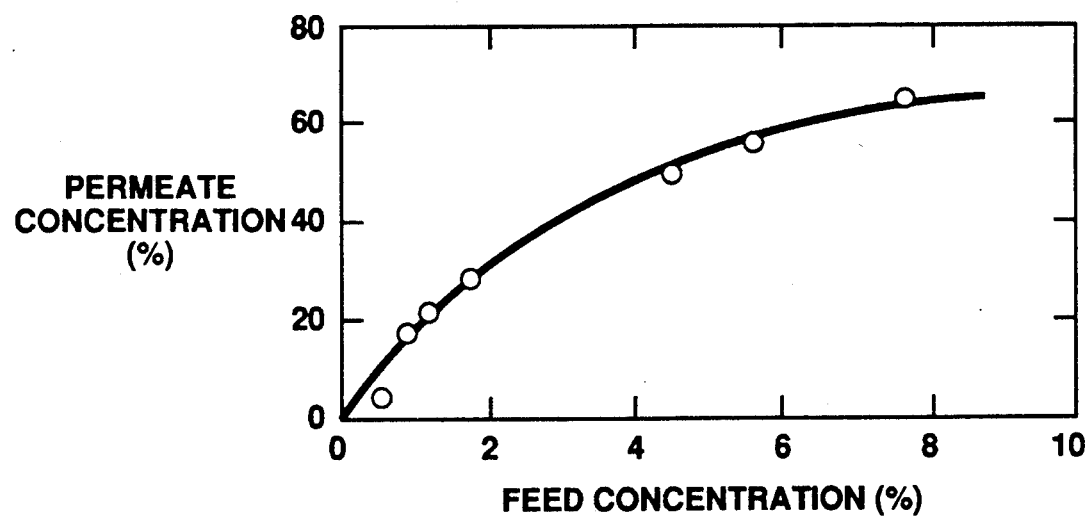
FIG. 14 is a graph showing the relationship between feed and permeate concentrations of HCFC-123 at feed concentrations up to about 8%.

The experimental procedures described were carried out using a feedstream containing HCFC-123 ($C_2HCl_2F_3$) in nitrogen in concentrations from 0.5-8%. The module contained a composite membrane with an area of approximately 2,000 cm². The results are summarized in FIG. 14. The calculated $CFC/N_2$ selectivity of the module remained constant at about 25 over the feed concentration range.

EXAMPLE 10

Figure 15:
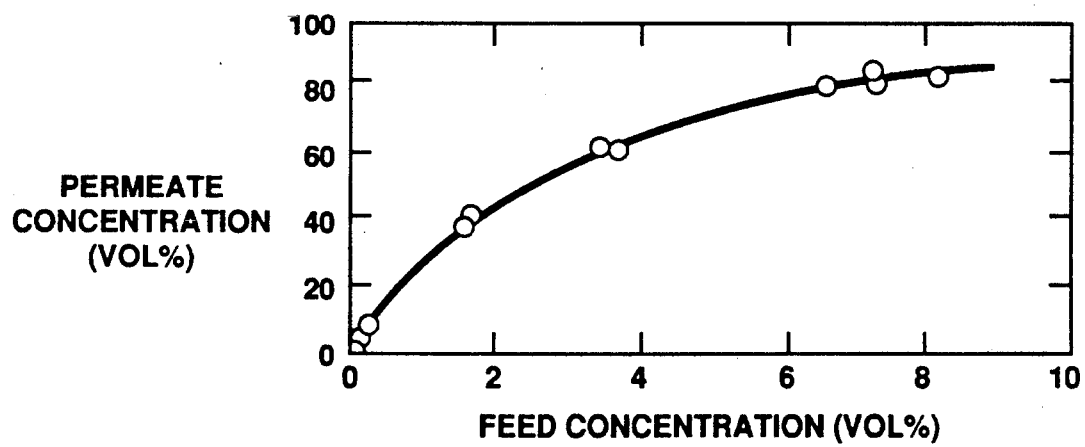
FIG. 15 is a graph showing the relationship between feed and permeate concentrations of methylene chloride at feed concentrations up to about 8%.

The experimental procedures described above were carried out using a membrane module containing a composite membrane with an area of 2,000 cm². The feedstream comprised nitrogen and methylene chloride, the methylene chloride concentration in the feed varying from about 0.1% to 8%. A plot of methylene chloride concentration in the feed against methylene chloride concentration in the permeate is given in FIG. 15. Typically the permeate was enriched about 30-fold compared with the feed at low feed concentrations. At higher concentrations the degree of enrichment dropped to about 10-20 fold. A feedstream containing 2% methylene chloride yielded a permeate containing 44% methylene chloride. A feedstream containing 8% methylene chloride yielded a permeate containing 84% methylene chloride.

EXAMPLE 11

A composite membrane was prepared by coating a support membrane with a permselective membrane made from a polyamide-polyether block copolymer having the following formula:

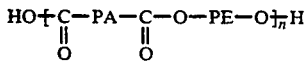

where PA is a polyamide segment, PE is a polyether segment, and n is a positive integer. A stamp of the membrane having an area of 12.6 cm² was tested at 61° C. with a gas mixture containing sulfur dioxide. The pressure on the permeate side of the test cell was maintained at 6.5 cmHg. The feed pressure was 90 cmHg. Permeation results are summarized in Table 2.

TABLE 2

Permeability Data for a Polyamide-polyether membrane

| | | |
|---|---|---|
| Temperature: | | 61° C. |
| Stage cut: | | 1.1% |
| Feed pressure: | | 90 cmHg |
| Permeate pressure: | | 6.5 cmHg |

| Component | Feed composition (%) | Normalized flux $cm^3$ (STP)/$cm^2 \cdot s \cdot cmHg$ | Selectivity |
|---|---|---|---|
| $N_2$ | 68.1 | $2.33 \times 10^{-5}$ | |
| $O_2$ | 5.8 | $5.37 \times 10^{-5}$ | $SO_2/N_2$ 251 |
| $CO_2$ | 8.2 | $6.05 \times 10^{-4}$ | $SO_2/CO_2$ 10.1 |
| $SO_2$ | 0.33 | $6.12 \times 10^{-3}$ | |
| $H_2O$ | 17.6 | $4.7 \times 10^{-3}$ | $SO_2/H_2O$ 1.3 |

GROUP 2 EXAMPLES

Examples 12-16. System designs and analyses

This set of examples compares treatment of a CFC-11 laden stream by condensation alone and by the process of the invention. The stream has a flow rate of 100 scfm and contains 50% CFC-11 in all cases. The membrane calculations are all based on CFC-11 selectivities determined in single module experiments of the type described in the first group of examples. The calculations were performed using a computer program based on the gas permeation equations for cross flow conditions described by Shindo et al., "Calculation Methods for Multicomponent Gas Separation by Permeation," Sep. Sci. Technol. 20, 445-459 (1985). The membrane area required was generated by the computer program. The chiller capacity was extrapolated from product literature provided by Filtrine Manufacturing Company, of Harrisville, N.H. The capacities of the vacuum pumps and compressors were obtained or extrapolated from performance specification charts and other data from the manufacturers. Energy calculations were done by calculating the adiabatic ideal work of compression and dividing by the efficiency of the unit. Compressor efficiency was taken to be 60%: vacuum pump efficiency was taken to be 35%.

EXAMPLE 12

Compression to 5 atmospheres plus chilling to 7° C.

The CFC-11 laden stream is compressed to 5 atmospheres, then chilled to 7° C. and condensed. The performance is characterized as shown in Table 3.

TABLE 3

| Stream | Composition | Flow rate |
|---|---|---|
| Feed | 50% CFC-11 in air | 100 scfm |
| Liquid condensate | Pure CFC-11 | 7.7 kg/min |
| Non-condensed off-gas from condenser: | 10.9% CFC-11 | 56.1 scfm |
| Fractional recovery of CFC from feed: 88% | | |
| Energy requirement (hp) | | |
| Total: 29.6 | Compressor: 19.6 | Chiller/condenser: 10 |

EXAMPLE 13

Compression to 25 atmospheres plus chilling to 7° C.

The CFC-11 laden stream is compressed to 25 atmospheres, then chilled to 7° C. and condensed. The performance is characterized as shown in Table 4.

TABLE 4

| Stream | Composition | Flow rate |
|---|---|---|
| Feed | 50% CFC-11 in air | 100 scfm |
| Liquid condensate | Pure CFC-11 | 8.6 kg/min |
| Non-condensed off-gas from condenser: | 2.18% CFC-11 | 51.1 scfm |
| Fractional recovery of CFC from feed: 98% | | |
| Energy requirement (hp) | | |
| Total: 61.4 | Compressor: 50.4 | Chiller/condenser: 11 |

EXAMPLE 14

Compression to 5 atmospheres plus chilling to −27° C.

This example achieves the same performance as Example 13 above, by using less compression but a lower chiller temperature. The CFC-11 laden stream is compressed to 5 atmospheres, then chilled to −27° C. and condensed. The performance is characterized as shown in Table 5.

TABLE 5

| Stream | Composition | Flow rate |
|---|---|---|
| Feed | 50% CFC-11 in air | 100 scfm |
| Liquid condensate | Pure CFC-11 | 8.6 kg/min |
| Non-condensed off-gas from condenser: | 2.18% CFC-11 | 51.1 scfm |
| Fractional recovery of CFC from feed: 98% | | |
| Energy requirement (hp) | | |
| Total: 74.6 | Compressor: 19.6 | Chiller/condenser: 55 |

EXAMPLE 15

Hybrid System Employing the Process of the Invention

A process was designed to achieve the same level of performance as in Examples 13 and 14. The process involved a condensation step followed by a membrane separation step. In the condensation step, the CFC-11 laden stream is compressed to 5 atmospheres, then chilled to 7° C. and condensed. The non-condensed off-gas from the condensation step is then subjected to a membrane separation step, using a membrane with a selectivity for CFC-11 over air of 30. A pressure drop across the membrane is provided only by the elevated pressure of the compressed feed. The permeate stream from the membrane separation step is returned for treatment in the condensation step. The performance is characterized as shown in Table 6.

TABLE 6

| Stream | Composition | Flow rate |
|---|---|---|
| CONDENSATION STEP: | | |
| Feed | 50% CFC-11 in air input + 24.3% from membrane = 43.6% | 100 scfm input + 33.3 scfm returned from membrane step = 133.3 scfm |
| Liquid condensate | Pure CFC-11 | 8.6 kg/min |
| Condenser off-gas | 10.9% CFC-11 | 84.4 scfm |
| MEMBRANE SEPARATION STEP: | | |
| Feed | 10.9% CFC-11 | 84.4 scfm |
| Residue | 2.18% CFC-11 | 51.1 scfm |
| Permeate | 24.3% CFC-11 | 33.3 scfm |
| Membrane area: 41.7 m² | | |
| Stage cut: 40% | | |
| Fractional recovery of CFC from feed: 98% | | |
| Energy requirement (hp) | | |
| Total: 39.1 | Compressor: 26.1 | Chiller/condenser: 13 |

Comparing this example with Examples 13 and 14, it may be seen that the process of the invention can reduce the energy demands for a treatment system to remove and recover 98% of the CFC from either 74.6 hp or 61.4 hp to 39.1 hp. In other words, the energy usage of the hybrid process is only 52% or 64% that of the comparable condensation process alone.

EXAMPLE 16

Hybrid System Employing the Process of the Invention

The process as in Example 15 was again considered. The only difference was the inclusion of a small vacuum pump on the permeate side of the membrane to lower the permeate pressure to 15 cmHg. The performance is characterized as shown in Table 7.

TABLE 7

| Stream | Composition | Flow rate |
|---|---|---|
| CONDENSATION STEP: | | |
| Feed | 50% CFC-11 in air input + 49.3% from membrane = 49.9% | 100 scfm input + 11.6 scfm returned from membrane step = 111.6 scfm |
| Liquid condensate | Pure CFC-11 | 8.6 kg/min |
| Condenser off-gas | 10.9% CFC-11 | 62.7 scfm |
| MEMBRANE SEPARATION STEP: | | |
| Feed | 10.9% CFC-11 | 62.7 scfm |
| Residue | 2.18% CFC-11 | 51.1 scfm |
| Permeate | 49.3% CFC-11 | 11.6 scfm |
| Membrane area: 8.1 m² | | |
| Stage cut: 18% | | |
| Fractional recovery of CFC from feed: 98% | | |
| Energy requirement (hp) | | |
| Total: 39.3 | Compressor: 21.9 Vacuum pump: 4.4 | Chiller/condenser: 13 |

Comparing this example with Example 15, several differences are apparent. To reduce the residue concentration to 2.18% in Example 15 requires a relatively high stage cut of 40%. The permeate volume flow is high, 33.3 scfm, so a more powerful compressor is needed to handle the additional load returned from the membrane unit. The membrane area, 41.7 m², is also large compared with Example 15. The use of a vacuum pump to lower the pressure on the permeate side means that the same degree of CFC removal can be achieved with a much smaller membrane area, 8.1 m², and a much lower stage cut, 18%. There is a corresponding saving in the energy requirements of the compressor. However, the energy used by the vacuum pump makes the overall energy demand of the system about the same in both cases. Both schemes achieve major improvements in performance compared with condensation alone.

GROUP 3 EXAMPLES

Examples 17-19

This set of examples compares treatment of a gas stream containing sulfur dioxide in air by condensation alone and by the process of the invention. The stream has a flow rate of 1,000 scfm and contains 50% sulfur dioxide in all cases. The calculations are performed in similar manner to those for the Group 2 examples. The membrane calculations were based on the performance of composite membranes having a permselective layer of polyamide-polyether block copolymer. The membrane selectivity for sulfur dioxide over air was taken to be 100, and the normalized sulfur dioxide flux was $6 \times 10^{-3}$ cm³(STP)/cm².s.cmHg.

EXAMPLE 17

Compression to 8 Atmospheres Plus Chilling to 6° C.

The sulfur dioxide laden stream is compressed to 8 atmospheres, then chilled to 6° C. and condensed. The boiling point of sulfur dioxide is −10° C., so under these compression/chilling conditions, 25% sulfur dioxide remains in the vent gas from the condenser. The performance is characterized as shown in Table 8.

TABLE 8

| Stream | Composition | Flow rate |
|---|---|---|
| Feed | 50% SO₂ in air | 1,000 scfm |
| Liquid condensate | Pure SO₂ | 30 kg/min |
| Non-condensed | 25% SO₂ | 625 scfm |

TABLE 8-continued

| Stream | Composition | Flow rate |
|---|---|---|
| off-gas from condenser: | | |

EXAMPLE 18

Compression to 40 Atmospheres Plus Chilling to 6° C.

The sulfur dioxide laden stream is compressed to 40 atmospheres, then chilled to 6° C. and condensed. The sulfur dioxide content of the vent gas is reduced to 5% under these conditions, but the energy and cost requirements of the system are more than double those of Example 17. The performance is characterized as shown in Table 9.

TABLE 9

| Stream | Composition | Flow rate |
|---|---|---|
| Feed | 50% $SO_2$ in air | 1,000 scfm |
| Liquid condensate | Pure $SO_2$ | 38 kg/min |
| Non-condensed off-gas from condenser: | 5% $SO_2$ | 526 scfm |

EXAMPLE 19

Hybrid System Employing the Process of the Invention

A process was designed employing the condensation step exactly as in Example 17, followed by a membrane separation step to treat the condensation step vent gas stream, using a membrane with a selectivity for sulfur dioxide over air of 100. A pressure drop across the membrane is provided only by the elevated pressure of the compressed feed. The performance is characterized as shown in Table 10.

TABLE 10

| Stream | Composition | Flow rate |
|---|---|---|
| CONDENSATION STEP: | | |
| Feed | 50% $SO_2$ in air | 1,000 scfm |
| Liquid condensate | Pure $SO_2$ | 39.5 kg/min |
| Non-condensed off-gas from condenser: | 25% $SO_2$ | 625 scfm |
| MEMBRANE SEPARATION STEP: | | |
| Feed | 25% $SO_2$ | 625 scfm |
| Residue | 1.0% $SO_2$ | 505 scfm |
| Permeate | 55.6% $SO_2$ | 120 scfm |

The permeate from the membrane separation step is richer in sulfur dioxide content than the original gas stream to be treated, and can be returned for treatment by the condensation step. The hybrid process is able to reduce the concentration of sulfur dioxide in the vented gas stream from 25% to 1%, with no extra energy consumption whatsoever, because the driving force for membrane permeation is provided by the relatively high pressure of the already compressed feed.

GROUP 4 EXAMPLES

Examples 20–22. Hybrid systems where membrane separation step precedes condensation step.

In this set of examples, it is assumed that the streams to be treated are dilute, so that the membrane separation step is performed before the condensation step. The stream is available at ambient pressure and the driving force for permeation is created by compressing the feed to 15 psig and lowering the permeate pressure. The calculations of membrane performance and energy consumption are performed in the same manner as for the group 2 and 3 examples.

EXAMPLE 20

A process was designed, employing a two-stage membrane separation step followed by a condensation step, to treat a 1,000 scfm stream containing 0.5% CFC-113 ($C_2Cl_3F_3$). The feedstream is compressed to 15 psig and passes through the first membrane stage, having an area of 1,070 m$^2$. A pressure drop across the membrane is provided by a vacuum pump on the permeate side. The residue stream contains 250 ppm CFC-113 at 995 scfm and the permeate stream produced by this first stage contains 2.3% CFC-113. This permeate stream passes to the second membrane stage, having an area of 200 m$^2$, where the CFC content is reduced to 0.5%. The residue stream from the second stage is recirculated to the inlet of the first membrane stage. The permeate stream produced by the second stage contains 11.2% CFC-113 and is passed to the condensation step, where it is compressed to 100 psig and chilled to 5° C. The non-condensed stream from the condensation step is returned to the inlet of the second membrane stage. Table 11 summarizes the process performance.

TABLE 11

| | FEED | PERMEATE | RESIDUE |
|---|---|---|---|
| Flow (scfm) | 1,000 | 140 lb/h liquid | 995 |
| Concentration (%) | 0.5 | 11.2 | 250 ppm |
| Membrane Selectivity | 25 | | |
| Membrane Area | 1,270 m$^2$ | | |
| Vacuum Pumps | 248 hp | | |
| Compressors | 155 hp | | |

The process as configured yields only two streams: a residue stream containing 250 ppm CFC and a clean liquid CFC permeate stream. The capital cost of the system, including pumps, compressors and membrane system, was estimated to be $680,000 or $600/scfm feed. Operating cost was estimated at $316,000 per year or 33 cents/lb CFC-113 recovered.

EXAMPLE 21

A process was designed, employing a two-step membrane separation step followed by a condensation step, to treat a 1,000 scfm stream containing 10% methylene chloride. The stream is compressed to 15 psig and passes through the two membrane steps in series. The membrane units have areas of 319 m$^2$ and 280 m$^2$ respectively. Vacuum pumps on the permeate sides of the membranes provide a pressure drop across the membranes. The final residue stream contains 0.2% methylene chloride and has a flow rate of 807 scfm. The permeate from the second step contains 9.8% methylene chloride and is returned to the inlet to the first membrane step. The permeate from the first step contains 50.6% methylene chloride and is passed to the condensation step. The condensation step involves no compression. The stream is chilled to −12° C. Table 12 summarizes the performance of the system.

TABLE 12

| MEMBRANE SEPARATION STEP: | | | |
|---|---|---|---|
| | FEED | PERMEATE | RESIDUE |
| Flow (scfm) | 1,000 | 194 | 807 |
| Concentration (%) | 10 | 50.6 | 0.2 |
| Membrane Selectivity | 40 | | |
| Membrane Area | 599 m$^2$ | | |

TABLE 12-continued

| CONDENSATION STEP: | | |
|---|---|---|
| Stream | Composition | Flow rate |
| Feed | 50.6% | 194 scfm |
| Liquid condensate | Pure methylene chloride | 90.6 lb/h |
| Condenser off-gas | 10% | 81.3 scfm |

EXAMPLE 22

Calculations for the process design of Example 21 were repeated. In this case, the condensation step was performed by compressing to 2 atmospheres, then chilling only to 1° C. Table 13 summarizes the performance of the system.

TABLE 13

| MEMBRANE SEPARATION STEP: | | | |
|---|---|---|---|
| | FEED | PERMEATE | RESIDUE |
| Flow (scfm) | 1,000 | 194 | 807 |
| Concentration (%) | 10 | 50.6 | 0.2 |
| Membrane Selectivity | | 40 | |
| Membrane Area | | 599 m² | |

| CONDENSATION STEP: | | |
|---|---|---|
| Stream | Composition | Flow rate |
| Feed | 50.6% | 194 scfm |
| Liquid condensate | Pure methylene chloride | 90.6 lb/h |
| Condenser off-gas | 10% | 81.3 scfm |
| Energy requirement (hp) | | |
| Total: 414 | Compressor: 91 | Chiller/condenser: 19 |
| | Vacuum pump: 304 | |

I claim:

1. A process for recovering a condensable component from a gas stream, comprising the steps of:
   (a) providing an incoming gas stream containing a condensable component, characterized by a boiling point higher than −100° C.;
   (b) performing a condensation step, comprising:
   bringing said incoming gas stream to a condition characterized in that the concentration of said condensable component is greater than its saturation concentration at said condition, so that condensation of a portion of said condensable component occurs;
   withdrawing a condensed stream comprising said condensable component in liquid form;
   withdrawing a non-condensed stream depleted in said condensable component compared with said incoming gas stream;
   (c) performing a membrane separation step, comprising:
   providing a membrane having a feed side and a permeate side;
   providing a pressure difference between the permeate and feed sides of the membrane, such that the ratio of the pressure on the permeate side to the pressure on the feed side is in the range 0.005–0.5;
   contacting said feed side with said non-condensed stream from said condensation step;
   withdrawing from said permeate side a permeate stream enriched in said condensable component compared with said non-condensed stream;
   wherein the membrane separation step is characterized by a stage cut less than about 40%;
   (d) recycling said permeate stream to said condensation step (b).

2. The process of claim 1, wherein said membrane is a composite membrane comprising a microporous support layer and a thin permselective coating layer.

3. The process of claim 1, wherein said membrane comprises a rubbery polymer.

4. The process of claim 1, wherein said membrane comprises silicone rubber.

5. The process of claim 1, wherein said membrane comprises a polyamidepolyether block copolymer having the formula:

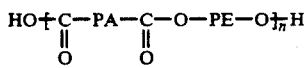

where PA is a polyamide segment, PE is a polyether segment, and n is a positive integer.

6. The process of claim 1, wherein said membrane has a selectivity for said condensable component compared with a second component of said incoming gas stream of at least 5.

7. The process of claim 1, wherein said membrane has a selectivity for said condensable component compared with a second component of said incoming gas stream of at least 10.

8. The process of claim 1, wherein said condensable component comprises sulfur dioxide.

9. The process of claim 1, wherein said condensable component comprises an organic vapor.

10. The process of claim 1, wherein said condensable component comprises a chlorinated hydrocarbon.

11. The process of claim 1, wherein said condensable component comprises a chlorofluorocarbon.

12. The process of claim 1, wherein said condensation step includes a compression step to raise the pressure of said incoming gas stream and a chilling step to lower the temperature of said incoming gas stream.

13. The process of claim 12, wherein said compression step does not raise the pressure of said incoming gas stream above 15 atmospheres.

14. The process of claim 12, wherein said chilling step does not lower the temperature of said incoming gas stream below 0° C.

15. The process of claim 1, wherein at least 90% of said condensable component is recovered.

16. The process of claim 1, wherein said membrane separation step comprises:
   providing a membrane having a feed side and a permeate side;
   providing a pressure difference between the permeate and feed sides of the membrane, such that the ratio of the pressure on the permeate side to the pressure on the feed side is in the range 0.005–0.5;
   contacting said feed side with said non-condensed stream from said condensation step;
   withdrawing from said feed side a residue stream enriched in said condensable component compared with said non-condensed stream;
   (d) recycling said residue stream to said condensation step (b).

17. The process of claim 1, wherein said membrane separation step comprises:
   providing a membrane array, each membrane within said array having a feed side and a permeate side;
   providing a pressure difference between the permeate and feed sides of each membrane, such that the ratio of the pressure on the permeate side to the pressure on the feed side of each membrane is in the range 0.005–0.5;
contacting said membrane array with said non-condensed stream from said condensation step;
withdrawing from said membrane array a product permeate stream enriched in said condensable component compared with said non-condensed stream;
(d) recycling said product permeate stream to said condensation step (b).

18. The process of claim 17, wherein said membrane array comprises a multiplicity of membrane units connected in a series arrangement.

19. The process of claim 17, wherein said membrane array comprises a multiplicity of membrane units connected in a cascade arrangement.

20. The process of claim 17, wherein said membrane array comprises a multiplicity of membrane units connected in a mixed series/cascade arrangement.

21. The process of claim 20, wherein said membrane comprises a rubbery polymer.

22. The process of claim 17, wherein said membrane separation step comprises:
providing a membrane array, each membrane within said array having a feed side and a permeate side;
providing a pressure difference between the permeate and feed sides of each membrane, such that the ratio of the pressure on the permeate side to the pressure on the feed side of each membrane is in the range 0.005–0.5;
contacting said membrane array with said non-condensed stream from said condensation step;
withdrawing from said membrane array a product residue stream enriched in said condensable component compared with said non-condensed stream;
(d) recycling said product residue stream to said condensation step (b).

23. The process of claim 1, wherein the conditions under which said condensation step is performed are characterized by a temperature no lower than −100° C.

24. A process for recovering a condensable component from a gas stream, comprising the steps of:
(a) providing an incoming gas stream containing a condensable component, characterized by a boiling point higher than −100° C.;
(b) performing a membrane separation step, comprising:
providing a membrane having a feed side and a permeate side;
providing a pressure difference between the permeate and feed sides of the membrane, such that the ratio of the pressure on the permeate side to the pressure on the feed side is in the range 0.005–0.5;
contacting said feed side with said incoming gas stream;
withdrawing from said permeate side a withdrawn stream enriched in said condensable component compared with said incoming gas stream;
wherein the membrane separation step is characterized by a stage cut less than about 40%;
(c) performing a condensation step, comprising:
bringing said withdrawn stream to a condition characterized in that the concentration of said condensable component is greater than its saturation concentration at said condition, so that condensation of a portion of said condensable component occurs;
withdrawing a condensed stream comprising said condensable component in liquid form;
withdrawing a non-condensed stream depleted in said condensable component compared with said permeate stream;
(d) recycling said non-condensed stream to said membrane separation step (b).

25. The process of claim 24, wherein said membrane is a composite membrane comprising a microporous support layer and a thin permselective coating layer.

26. The process of claim 24, wherein said membrane comprises silicone rubber.

27. The process of claim 24, wherein said membrane comprises a polyamide-polyether block copolymer having the formula:

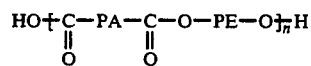

where PA is a polyamide segment, PE is a polyether segment, and n is a positive integer.

28. The process of claim 24, wherein said membrane has a selectivity for said condensable component compared with a second component of said incoming gas stream of at least 5.

29. The process of claim 24, wherein said membrane has a selectivity for said condensable component compared with a second component of said incoming gas stream of at least 10.

30. The process of claim 24, wherein said condensable component comprises sulfur dioxide.

31. The process of claim 24, wherein said condensable component comprises an organic vapor.

32. The process of claim 24, wherein said condensable component comprises a chlorinated hydrocarbon.

33. The process of claim 24, wherein said condensable component comprises a chlorofluorocarbon.

34. The process of claim 24, wherein said condensation step includes a compression step to raise the pressure of said incoming gas stream and a chilling step to lower the temperature of said incoming gas stream.

35. The process of claim 34, wherein said compression step does not raise the pressure of said incoming gas stream above 15 atmospheres.

36. The process of claim 34, wherein said chilling step does not lower the temperature of said incoming gas stream below 0° C.

37. The process of claim 24, wherein at least 90% of said condensable component is recovered.

38. The process of claim 24, wherein said membrane separation step comprises:
providing a membrane having a feed side and a permeate side;
providing a pressure difference between the permeate and feed sides of the membrane, such that the ratio of the pressure on the permeate side to the pressure on the feed side is in the range 0.005–0.5;
contacting said feed side with said incoming gas stream;
withdrawing from said residue side a withdrawn stream enriched in said condensable component compared with said incoming gas stream.

39. The process of claim 24, wherein said membrane separation step comprises:
providing a membrane array, each membrane within said array having a feed side and a permeate side;

providing a pressure difference between the permeate and feed sides of each membrane, such that the ratio of the pressure on the permeate side to the pressure on the feed side of each membrane is in the range 0.005-0.5;

contacting said membrane array with said incoming gas stream;

withdrawing from said membrane array a product permeate stream enriched in said condensable component compared with said incoming gas stream.

40. The process of claim 39, wherein said membrane array comprises a multiplicity of membrane units connected in a series arrangement.

41. The process of claim 39, wherein said membrane array comprises a multiplicity of membrane units connected in a cascade arrangement.

42. The process of claim 39, wherein said membrane array comprises a multiplicity of membrane units connected in a mixed series/cascade arrangement.

43. The process of claim 39, wherein said membrane separation step comprises:

providing a membrane array, each membrane within said array having a feed side and a permeate side;

providing a pressure difference between the permeate and feed sides of each membrane, such that the ratio of the pressure on the permeate side to the pressure on the feed side of each membrane is in the range 0.005-0.5;

contacting said membrane array with said incoming gas stream;

withdrawing from said membrane array a withdrawn stream enriched in said condensable component compared with said incoming gas stream.

44. The process of claim 39, wherein step (d) is replaced by:

(d) performing a second membrane separation step, comprising:

providing a second membrane array, each membrane within said array having a feed side and a permeate side;

providing a pressure difference between the permeate and feed sides of each membrane, such that the ratio of the pressure on the permeate side to the pressure on the feed side of each membrane is in the range 0.005-0.5;

contacting said second membrane array with said non-condensed stream;

withdrawing from said second membrane array a second product permeate stream enriched in said organic component compared with said non-condensed stream;

and further comprising step (e) recycling said second product permeate stream to said condensation step.

45. The process of claim 24, wherein the conditions under which said condensation step is performed are characterized by a temperature no lower than $-100°$ C.

* * * * *

REEXAMINATION CERTIFICATE (2489th)
United States Patent [19]
Wijmans

[11] B1 5,089,033
[45] Certificate Issued Feb. 21, 1995

[54] PROCESS FOR REMOVING CONDENSABLE COMPONENTS FROM GAS STREAMS

[75] Inventor: Johannes G. Wijmans, Menlo Park, Calif.

[73] Assignee: Membrane Technology and Research, Inc., Menlo Park, Calif.

Reexamination Request:
No. 90/003,149, Aug. 2, 1993

Reexamination Certificate for:
Patent No.: 5,089,033
Issued: Feb. 18, 1992
Appl. No.: 649,305
Filed: Jan. 30, 1991

Related U.S. Application Data

[63] Continuation of Ser. No. 432, 592, Nov. 2, 1989, abandoned.

[51] Int. Cl.⁶ .................... B01D 53/22; B01D 71/24
[52] U.S. Cl. ........................... 95/39; 95/48; 95/49; 95/50; 96/12
[58] Field of Search ............ 95/39, 45, 50, 52; 96/4, 7-13

[56] References Cited

U.S. PATENT DOCUMENTS

| | | | |
|---|---|---|---|
| 4,553,983 | 11/1985 | Baker | 95/50 |
| 4,654,063 | 3/1987 | Auvil et al. | 95/55 X |
| 4,857,078 | 8/1989 | Watler | 55/16 |
| 4,963,165 | 10/1990 | Blume et al. | 95/46 |
| 4,994,094 | 2/1991 | Behling et al. | 95/141 X |

FOREIGN PATENT DOCUMENTS 3806107 8/1989 Germany .

OTHER PUBLICATIONS

William J. Schell, "Spiral-Wound Permeators for Purification and Recovery", *CEP*, Oct. 1982, pp. 33-37.

R. P. Behling, "Separation of Hydrocarbon Vapors from Air", as presented at the Sixth Annual Membrane Technology/Planning Conference, Nov. 1-3, 1988, Cambridge, Mass.

H. Paul et al., "Removal of Organic Vapors from Air by Selective Membrane Permeation", J. of Membrane Science, 36 (1988) 363-372.

K. Kimmerle et al., "Solvent Recovery from Air", J. of Membrane Science, 36 (1988) 477-488.

A. Nakamura et al., "Applications of the Aromatic Polyimide Membranes", Membrane, 12(5), 293-294 (1987).

*Primary Examiner*—Robert H. Spitzer

[57] ABSTRACT

A process for treating a gas stream to remove or recover a condensable component. The process involves a condensation step and a membrane concentration step. The condensation step may be followed by the membrane step, or vice versa. The process can be designed to yield only two product streams: one, the condensed liquid, ready for use, reuse or discard, and two, a residue gas stream, which in most cases will be clean enough for direct discharge or reuse. This result is achieved by recycling other streams within the process. Recovery of 90% or more of the condensable component can be achieved. The process offers substantially energy savings compared with condensation alone.

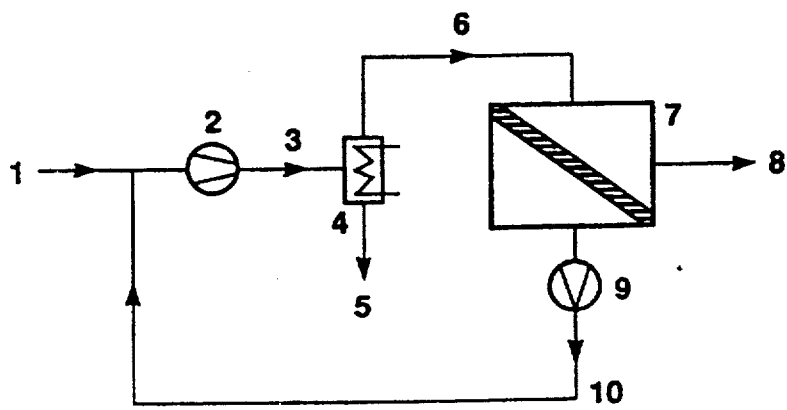

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–23 is confirmed.

Claims 30 and 31 are cancelled.

Claims 24, 28, 29, 32, 33, 37–39 and 43 are determined to be patentable as amended.

Claims 25–27, 34–36, 40–42, 44 and 45, dependent on an amended claim, are determined to be patentable.

New claims 46–100 are added and determined to be patentable.

24. A process for recovering a condensable *organic* component from a gas stream, comprising the steps of:
 (a) providing an incoming gas stream containing a condensable *organic* component, characterized by a boiling point higher than −100° C.;
 (b) performing a membrane separation step, comprising:
  providing a membrane *comprising a rubbery polymer, said membrane* having a feed side and a permeate side;
  providing a pressure difference between the permeate and feed sides of the membrane, such that the ratio of the pressure on the permeate side to the pressure on the feed side is in the range 0.005–0.5;
  contacting said feed side with said incoming gas stream;
  withdrawing from said permeate side a withdrawn stream enriched in said condensable *organic* component compared with said incoming gas stream;
  wherein the membrane separation step is characterized by a stage cut less than about 40%;
 (c) performing a condensation step, comprising:
  bringing said withdrawn stream to a condition characterized in that the concentration of said condensable *organic* component is greater than its saturation concentration at said condition, so that condensation of a portion of said condensable *organic* component occurs;
  withdrawing a condensed stream comprising said condensable *organic* component in liquid form;
  withdrawing a non-condensed stream depleted in said condensable *organic* component compared with said permeate stream;
 (d) recycling said non-condensed stream to said membrane separation step (b).

28. The process of claim 24, wherein said membrane has a selectivity for said condensable *organic* component compared with a second component of said incoming gas stream of at least 5.

29. The process of claim 24, wherein said membrane has a selectivity for said condensable *organic* component compared with a second component of said incoming gas stream of at least 10.

32. The process of claim 24, wherein said condensable *organic* component comprises a chlorinated hydrocarbon.

33. The process of claim 24, wherein said condensable *organic* component comprises a chlorofluorocarbon.

37. The process of claim 24, wherein at least 90% of said condensable *organic* component is recovered.

38. The process of claim 24, wherein said membrane separation step comprises:
 providing a membrane having a feed side and a permeate side;
 providing a pressure difference between the permeate and feed sides of the membrane, such that the ratio of the pressure on the permeable side to the pressure on the feed side is in the range 0.005–0.5;
 contacting said feed side with said incoming gas stream;
 withdrawing from said residue side a withdrawn stream enriched in said condensable *organic* component compared with said incoming gas stream.

39. The process of claim 24, wherein said membrane separation step comprises:
 providing a membrane array, each membrane within said array having a feed side and a permeate side;
 providing a pressure difference between the permeate and feed sides of each membrane, such that the ratio of the pressure on the permeate side to the pressure on the feed side of each membrane is in the range 0.005–0.5;
 contacting said membrane array with said incoming gas stream;
 withdrawing from said membrane array a product permeate stream enriched in said condensable *organic* component compared with said incoming gas stream.

43. The process of claim 39, wherein said membrane separation step comprises:
 providing a membrane array, each membrane within said array having a feed side and a permeate side;
 providing a pressure difference between the permeate and feed sides of each membrane, such that the ratio of the pressure on the permeate side to the pressure on the feed side of each membrane is in the range 0.005–0.5;
 contacting said membrane array with said incoming gas stream;
 withdrawing from said membrane array a withdrawn stream enriched in said condensable *organic* component compared with said incoming gas stream.

*46. The process of claim 12, wherein said chilling step does not lower the temperature of said incoming gas stream below 10° C.*

*47. The process of claim 12, wherein said chilling step does not lower the temperature of said incoming gas stream below −45° C.*

*48. The process of claim 1, wherein said gas stream comprises natural gas.*

*49. The process of claim 1, wherein at least 95% of said condensable component is recovered.*

*50. The process of claim 1, wherein at least 98% of said condensable component is recovered.*

51. The process of claim 1, wherein said incoming gas stream contains said condensable component in a concentration in the range 20–100% saturation.

52. A process for recovering a condensable component from a gas stream, comprising the steps of:
   (a) providing an incoming gas stream containing a condensable component, characterized by a boiling point higher than $-100°$ C.;
   (b) performing a condensation step, comprising:
      bringing said incoming gas stream to a condition characterized in that the concentration of said condensable component is greater than its saturation concentration at said condition, so that condensation of a portion of said condensable component occurs;
      withdrawing a condensed stream comprising said condensable component in liquid form;
      withdrawing a non-condensed stream depleted in said condensable component compared with said incoming gas stream;
   (c) performing a membrane separation step, comprising:
      providing a membrane having a feed side and a permeate side;
      providing a pressure difference between the permeate and feed sides of the membrane, such that the ratio of the pressure on the permeate side to the pressure on the feed side is in the range 0.005–0.5;
      contacting said feed side with said non-condensed stream from said condensation step;
      withdrawing from said permeate side a permeate stream enriched in said condensable component compared with said non-condensed stream;
      wherein the membrane separation step is characterized by a stage cut less than about 40%;
   (d) recycling said permeate stream to said condensation step (b);
   said process being characterized in that at least 90% of said condensable component is recovered.

53. A process for recovering a condensable component from a gas stream, comprising the steps of:
   (a) providing an incoming gas stream containing a condensable component, characterized by a boiling point higher than $-100°$ C.;
   (b) performing a condensation step at a temperature no lower than about $-45°$ C., comprising:
      bringing said incoming gas stream to a condition characterized in that the concentration of said condensable component is greater than its saturation concentration at said condition, so that condensation of a portion of said condensable component occurs;
      withdrawing a condensed stream comprising said condensable component in liquid form;
      withdrawing a non-condensed stream depleted in said condensable component compared with said incoming gas stream;
   (c) performing a membrane separation step, comprising:
      providing a membrane having a feed side and a permeate side;
      providing a pressure difference between the permeate and feed sides of the membrane, such that the ratio of the pressure on the permeate side to the pressure on the feed side is in the range 0.005–0.5;
      contacting said feed side with said non-condensed stream from said condensation step;
      withdrawing from said permeate side a permeate stream enriched in said condensable component compared with said non-condensed stream;
      wherein the membrane separation step is characterized by a stage cut less than about 40%;
   (d) recycling said permeate stream to said condensation step (b).

54. A process for recovering a condensable component from a gas stream, comprising the steps of:
   (a) providing an incoming gas stream containing a condensable component, characterized by a boiling point higher than $-100°$ C.;
   (b) performing a condensation step at a temperature no lower than about $-45°$ C., comprising:
      bringing said incoming gas stream to a condition characterized in that the concentration of said condensable component is greater than its saturation concentration at said condition, so that condensation of a portion of said condensable component occurs;
      withdrawing a condensed stream comprising said condensable component in liquid form;
      withdrawing a non-condensed stream depleted in said condensable component compared with said incoming gas stream;
   (c) performing a membrane separation step, comprising:
      providing a membrane having a feed side and a permeate side;
      providing a pressure difference between the permeate and feed sides of the membrane, such that the ratio of the pressure on the permeate side to the pressure on the feed side is in the range 0.005–0.5;
      contacting said feed side with said non-condensed stream from said condensation step;
      withdrawing from said permeate side a permeate stream enriched in said condensable component compared with said non-condensed stream;
      wherein the membrane separation step is characterized by a stage cut less than about 40%;
   (d) recycling said permeate stream to said condensation step (b);
   said process being characterized in that at least 90% of said condensable component is recovered.

55. A process for recovering propane, butane or heavier hydrocarbons from natural gas, comprising the steps of:
   (a) providing an incoming natural gas stream containing propane, butane or a heavier hydrocarbon;
   (b) performing a condensation step, comprising:
      bringing said incoming natural gas stream to a condition characterized in that the concentration of said propane, butane or heavier hydrocarbon is greater than its saturation concentration at said condition, so that condensation of a portion of said propane, butane or heavier hydrocarbon occurs;
      withdrawing a condensed stream comprising said propane, butane or heavier hydrocarbon in liquid form;
      withdrawing a non-condensed stream depleted in said propane, butane or heavier hydrocarbon compared with said incoming natural gas stream;
   (c) performing a membrane separation step, comprising:
      providing a membrane having a feed side and a permeate side;
      providing a pressure difference between the permeate and feed sides of the membrane, such that the ratio of the pressure on the permeate side to the pressure on the feed side is in the range 0.005–0.5;
      contacting said feed side with said non-condensed stream from said condensation step;
      withdrawing from said permeate side a permeate stream enriched in said propane, butane or heavier hydrocarbon compared with said non-condensed stream;

wherein the membrane separation step is characterized by a stage cut less than about 40%;

(d) recycling said permeate stream to said condensation step (b).

56. The process of claim 55, wherein said membrane is a composite membrane comprising a microporous support layer and a thin permselective coating layer.

57. The process of claim 55, wherein said membrane comprises a rubbery polymer.

58. The process of claim 55, wherein said condensation step does not lower the temperature of said incoming natural gas stream below 0° C.

59. The process of claim 55, wherein said condensation step does not lower the temperature of said incoming natural gas stream below −45° C.

60. The process of claim 55, wherein at least 90% of said propane, butane or heavier hydrocarbon is recovered.

61. A process for recovering propane, butane or heavier hydrocarbons from natural gas, comprising the steps of:

(a) providing an incoming natural gas stream containing propane, butane or a heavier hydrocarbon;

(b) performing a condensation step, comprising:
bringing said incoming natural gas stream to a condition characterized in that the concentration of said propane, butane or heavier hydrocarbon is greater than its saturation concentration at said condition, so that condensation of a portion of said propane, butane or heavier hydrocarbon occurs;
withdrawing a condensed stream comprising said propane, butane or heavier hydrocarbon in liquid form;
withdrawing a non-condensed stream depleted in said propane, butane or heavier hydrocarbon compared with said incoming natural gas stream;

(c) performing a membrane separation step, comprising:
providing a membrane having a feed side and a permeate side;
providing a pressure difference between the permeate and feed sides of the membrane, such that the ratio of the pressure on the permeate side to the pressure on the feed side is in the range 0.005–0.5;
contacting said feed side with said non-condensed stream from said condensation step;
withdrawing from said feed side a residue stream enriched in said propane, butane or heavier hydrocarbon compared with said non-condensed stream;
wherein the membrane separation step is characterized by a stage cut less than about 40%;

(d) recycling said residue stream to said condensation step (b).

62. The process of claim 61, wherein said stage cut is less than about 30%.

63. The process of claim 61, wherein said stage cut is less than about 18%.

64. A process for recovering a condensable component from a gas stream, said process consisting essentially of the steps:

(a) providing an incoming gas stream containing a condensable component, characterized by a boiling point higher than −100° C.;

(b) performing a condensation step, comprising:
bringing said incoming gas stream to a condition characterized in that the concentration of said condensable component is greater than its saturation concentration at said condition, so that condensation of a portion of said condensable component occurs;
withdrawing a condensed stream comprising said condensable component in liquid form;
withdrawing a non-condensed stream depleted in said condensable component compared with said incoming gas stream;

(c) performing a membrane separation step, comprising:
providing a membrane having a feed side and a permeate side;
providing a pressure difference between the permeate and feed sides of the membrane, such that the ratio of the pressure on the permeate side to the pressure on the feed side is in the range 0.005–0.5;
contacting said feed side with said non-condensed stream from said condensation step;
withdrawing from said permeate side a permeate stream enriched in said condensable component compared with said non-condensed stream;
wherein the membrane separation step is characterized by a stage cut less than about 40%;

(d) recycling said permeate stream to said condensation step (b).

65. In a membrane separation process for removing a condensable component, characterized by a boiling point higher than −100° C., from an incoming gas stream, said membrane separation process being characterized by: providing a pressure difference between a permeate side and a feed side of a membrane, such that the ratio of the pressure on the permeate side to the pressure on the feed side is in the range 0.005–0.5, by contacting said feed side with a feed stream, by withdrawing from said permeate side an enriched stream, enriched in said condensable component compared with said feed stream, and by a stage cut less than about 40%; the improvement comprising combining a removal technique of condensation with said membrane separation process by carrying out a condensation step, comprising bringing said incoming gas stream to a condition characterized in that the concentration of said condensable component is greater than its saturation concentration at said condition so that condensation of a portion of said condensable component occurs, before said membrane separation process, so that a non-condensed stream from said condensation step comprises said feed stream to said membrane separation process, and further by recycling said enriched stream from said membrane separation process to said condensation step.

66. The process of claim 65, wherein said condensation does not lower the temperature of said incoming gas stream below −45° C.

67. The process of claim 65, wherein said condensation does not lower the temperature of said incoming gas stream below 0° C.

68. The process of claim 65, wherein at least 90% of said condensable component is removed from said incoming gas stream.

69. The process of claim 65, wherein at least 95% of said condensable component is removed from said incoming gas stream.

70. The process of claim 65, wherein at least 98% of said condensable component is removed from said incoming gas stream.

71. In a condensation process for removing a condensable component, characterized by a boiling point higher than −100° C., from an incoming gas stream, said condensation process being characterized by bringing said incoming gas stream to a condition characterized in that the concentration of said condensable component is greater than its saturation concentration at said condition so that condensation of a portion of said condensable component occurs; the improvement comprising combining a removal technique of membrane separation with said condensation process by carrying out a membrane separation step after said condensation process, said membrane separation step comprising: providing a pressure difference between a permeate side and a feed side of a membrane, such that the ratio of the pressure on the permeate side to the pressure on the feed side is in the range 0.005–0.5; contacting said feed side with a non-condensed stream from said condensation process; withdrawing from said permeate side an enriched stream, enriched in said condensable component compared with said non-condensed stream; operating at a stage cut less than about 40%; and further by recycling said enriched stream to said condensation process.

72. The process of claim 71, wherein said condensation process does not lower the temperature of said incoming gas stream below $-45°$ C.

73. The process of claim 71, wherein said condensation process does not lower the temperature of said incoming gas stream below $0°$ C.

74. The process of claim 71, wherein at least 90% of said condensable component is removed from said incoming gas stream.

75. The process of claim 71, wherein at least 95% of said condensable component is removed from said incoming gas stream.

76. The process of claim 71, wherein at least 98% of said condensable component is removed from said incoming gas stream.

77. A process for recovering a condensable organic component from a gas stream, comprising the steps of:
  (a) providing an incoming gas stream containing a condensable organic component, characterized by a boiling point higher than $-100°$ C.;
  (b) performing a membrane separation step, comprising:
    providing a membrane comprising a rubbery polymer, said membrane having a feed side and a permeate side;
    providing a pressure difference between the permeate and feed sides of the membrane, such that the ratio of the pressure on the permeate side to the pressure on the feed side is in the range 0.005–0.5;
    contacting said feed side with said incoming gas stream;
    withdrawing from said permeate side a withdrawn stream enriched in said condensable organic component compared with said incoming gas stream;
    wherein the membrane separation step is characterized by a stage cut less than about 40%;
  (c) performing a condensation step at a temperature no lower than about $-45°$ C., comprising:
    bringing said withdrawn stream to a condition characterized in that the concentration of said condensable organic component is greater than its saturation concentration at said condition, so that condensation of a portion of said condensable organic component occurs;
    withdrawing a condensed stream comprising said condensable organic component in liquid form;
    withdrawing a non-condensed stream depleted in said condensable organic component compared with said permeate stream;
  (d) recycling said non-condensed stream to said membrane separation step (b).

78. A process for recovering a condensable organic component from a gas stream, comprising the steps of:
  (a) providing an incoming gas stream containing a condensable organic component, characterized by a boiling point higher than $-100°$ C.;
  (b) performing a membrane separation step, comprising:
    providing a membrane comprising a rubbery polymer, said membrane having a feed side and a permeate side;
    providing a pressure difference between the permeate and feed sides of the membrane, such that the ratio of the pressure on the permeate side to the pressure on the feed side is in the range 0.005–0.5;
    contacting said feed side with said incoming gas stream;
    withdrawing from said permeate side a withdrawn stream enriched in said condensable organic component compared with said incoming gas stream;
    wherein the membrane separation step is characterized by a stage cut less than about 40%;
  (c) performing a condensation step, comprising:
    bringing said withdrawn stream to a condition characterized in that the concentration of said condensable organic component is greater than its saturation concentration at said condition, so that condensation of a portion of said condensable organic component occurs;
    withdrawing a condensed stream comprising said condensable organic component in liquid form;
    withdrawing a non-condensed stream depleted in said condensable organic component compared with said permeate stream;
  (d) recycling said non-condensed stream to said membrane separation step (b);
  said process being characterized in that at least 90% of said condensable organic component is recovered.

79. A process for recovering a condensable organic component from a gas stream, comprising the steps of:
  (a) providing an incoming gas stream containing a condensable organic component, characterized by a boiling point higher than $-100°$ C.;
  (b) performing a membrane separation step, comprising:
    providing a membrane comprising a rubbery polymer, said membrane having a feed side and a permeate side;
    providing a pressure difference between the permeate and feed sides of the membrane, such that the ratio of the pressure on the permeate side to the pressure on the feed side is in the range 0.005–0.5;
    contacting said feed side with said incoming gas stream;
    withdrawing from said permeate side a withdrawn stream enriched in said condensable organic component compared with said incoming gas stream;
    wherein the membrane separation step is characterized by a stage cut less than about 40%;
  (c) performing a condensation step at a temperature no lower than about $-45°$ C., comprising:
    bringing said withdrawn stream to a condition characterized in that the concentration of said condensable organic component is greater than its saturation concentration at said condition, so that condensation of a portion of said condensable organic component occurs;
    withdrawing a condensed stream comprising said condensable organic component in liquid form;
    withdrawing a non-condensed stream depleted in said condensable organic component compared with said permeate stream;

(d) recycling said non-condensed stream to said membrane separation step (b);
said process being characterized in that at least 90% of said condensable organic component is recovered.

80. The process of claim 34, wherein said chilling step does not lower the temperature of said incoming gas stream below 10° C.

81. The process of claim 34, wherein said chilling step does not lower the temperature of said incoming gas stream below −45° C.

82. The process of claim 24, wherein said gas stream comprises natural gas.

83. The process of claim 24, wherein at least 95% of said condensable organic component is recovered.

84. The process of claim 24, wherein at least 98% of said condensable organic component is recovered.

85. The process of claim 24, wherein said incoming gas stream contains said condensable organic component in a concentration below about 20% saturation.

86. A process for recovering propane, butane or heavier hydrocarbons from natural gas, comprising the steps of:
(a) providing an incoming natural gas stream containing propane, butane or a heavier hydrocarbon;
(b) performing a membrane separation step, comprising:
providing a membrane having a feed side and a permeate side;
providing a pressure difference between the permeate and feed sides of the membrane, such that the ratio of the pressure on the permeate side to the pressure on the feed side is in the range 0.005–0.5;
contacting said feed side with said incoming natural gas stream;
withdrawing from said permeate side a permeate stream enriched in said propane, butane or heavier hydrocarbon compared with said incoming natural gas stream;
wherein the membrane separation step is characterized by a stage cut less than about 40%;
(c) performing a condensation step, comprising:
bringing said permeate stream to a condition characterized in that the concentration of said propane, butane or heavier hydrocarbon is greater than its saturation concentration at said condition, so that condensation of a portion of said propane, butane or heavier hydrocarbon occurs;
withdrawing a condensed stream comprising said propane, butane or heavier hydrocarbon in liquid form;
withdrawing a non-condensed stream depleted in said propane, butane or heavier hydrocarbon compared with said permeate stream;
(d) recycling said non-condensed stream to said membrane separation step (b).

87. The process of claim 86, wherein said membrane is a composite membrane comprising a microporous support layer and a thin permselective coating layer.

88. The process of claim 86, wherein said membrane comprises a rubbery polymer.

89. The process of claim 86, wherein said membrane has a selectivity for said propane or butane over methane of at least 5.

90. The process of claim 86, wherein said membrane has a selectivity for said propane or butane over methane of at least 10.

91. The process of claim 86, wherein said condensation step is carried out at a temperature no lower than 0° C.

92. The process of claim 86, wherein said condensation step is carried out at a temperature no lower than −45° C.

93. The process of claim 86, wherein at least 90% of said propane, butane or heavier hydrocarbon is recovered.

94. The process of claim 86, wherein said membrane separation step comprises:
providing a membrane having a feed side and a permeate side;
providing a pressure difference between the permeate and feed sides of the membrane, such that the ratio of the pressure on the permeate side to the pressure on the feed side is in the range 0.005–0.5;
contacting said feed side with said incoming natural gas stream;
withdrawing from said feed side a residue stream enriched in said propane, butane or heavier hydrocarbon compared with said incoming natural gas stream.

95. The process of claim 86, wherein said stage cut is less than about 30%.

96. The process of claim 86, wherein said stage cut is less than about 18%.

97. The process of claim 1, wherein said gas stream comprises air.

98. The process of claim 1, wherein said gas stream comprises nitrogen.

99. The process of claim 24, wherein said gas stream comprises air.

100. The process of claim 24, wherein said gas stream comprises nitrogen.

* * * * *